(12) United States Patent
Tsuruta et al.

(10) Patent No.: US 6,378,050 B1
(45) Date of Patent: Apr. 23, 2002

(54) INFORMATION PROCESSING APPARATUS AND STORAGE MEDIUM

(75) Inventors: Toru Tsuruta, Kawasaki; Yuji Nomura, Fukuoka, both of (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/288,693

(22) Filed: Apr. 9, 1999

(30) Foreign Application Priority Data

Apr. 23, 1998 (JP) .......................................... 10-112961

(51) Int. Cl.[7] .............................................. G06F 13/00
(52) U.S. Cl. ........................... 711/149; 711/1; 711/101; 711/131
(58) Field of Search .............................. 711/1, 101, 131, 711/149

(56) References Cited

U.S. PATENT DOCUMENTS

| 4,580,240 A | 4/1986 | Watanabe | 711/118 |
|---|---|---|---|
| 4,928,225 A * | 5/1990 | McCarthy et al. | 711/145 |
| 5,029,070 A * | 7/1991 | McCarthy et al. | 711/143 |
| 5,586,293 A * | 12/1996 | Baron et al. | 711/118 |
| 6,023,757 A * | 2/2000 | Nishimoto et al. | 712/209 |

FOREIGN PATENT DOCUMENTS

| EP | 0 529 217 | 3/1993 |
|---|---|---|
| GB | 2 284 911 | 6/1995 |
| JP | 63-98749 | 4/1988 |
| JP | 4-88537 | 3/1992 |

* cited by examiner

*Primary Examiner*—Reba I. Elmore
(74) *Attorney, Agent, or Firm*—Staas & Halsey LLP

(57) ABSTRACT

An information processing apparatus is constructed to include a judging part for decoding an address of an input request and outputting a judgement signal which indicates whether the input request is a cache control request or a DMA control request, and a control part for carrying out a cache control when the judgement signal from the judging part indicates the cache control request, and carrying out a DMA control when the judgement signal indicates the DMA control request.

21 Claims, 18 Drawing Sheets

FIG. 5

| Parameter Setting Mode | Number of Cache Indexes | 20 ~ 13 | 12 | 11 | 10 | 9 | 8 | 7 | 6 | 5 | 4 | 3~0 |
|---|---|---|---|---|---|---|---|---|---|---|---|---|
| 0 | 512 INDEX (0~511) | TAG | INDEX NUMBER | INDEX NUMBER | INDEX NUMBER | INDEX NUMBER | INDEX NUMBER | INDEX NUMBER | INDEX NUMBER | INDEX NUMBER | INDEX NUMBER | BYTE SELECTION |
| 1 | 256 INDEX (0~255) | TAG | TAG | INDEX NUMBER | INDEX NUMBER | INDEX NUMBER | INDEX NUMBER | INDEX NUMBER | INDEX NUMBER | INDEX NUMBER | INDEX NUMBER | BYTE SELECTION |
| 2 | 128 INDEX (0~127) | TAG | TAG | TAG | INDEX NUMBER | INDEX NUMBER | INDEX NUMBER | INDEX NUMBER | INDEX NUMBER | INDEX NUMBER | INDEX NUMBER | BYTE SELECTION |
| 3 | 64 INDEX (0~63) | TAG | TAG | TAG | TAG | INDEX NUMBER | INDEX NUMBER | INDEX NUMBER | INDEX NUMBER | INDEX NUMBER | INDEX NUMBER | BYTE SELECTION |
| 4 | 32 INDEX (0~31) | TAG | TAG | TAG | TAG | TAG | INDEX NUMBER | INDEX NUMBER | INDEX NUMBER | INDEX NUMBER | INDEX NUMBER | BYTE SELECTION |
| 5 | 16 INDEX (0~15) | TAG | TAG | TAG | TAG | TAG | TAG | INDEX NUMBER | INDEX NUMBER | INDEX NUMBER | INDEX NUMBER | BYTE SELECTION |
| 6 | 8 INDEX (0~7) | TAG | TAG | TAG | TAG | TAG | TAG | TAG | INDEX NUMBER | INDEX NUMBER | INDEX NUMBER | BYTE SELECTION |
| 7 | 4 INDEX (0~3) | TAG | TAG | TAG | TAG | TAG | TAG | TAG | TAG | INDEX NUMBER | INDEX NUMBER | BYTE SELECTION |
| 8 | 2 INDEX (0~1) | TAG | TAG | TAG | TAG | TAG | TAG | TAG | TAG | TAG | INDEX NUMBER | BYTE SELECTION |
| 9 | CACHE OFF | | | | | | | | | | | |

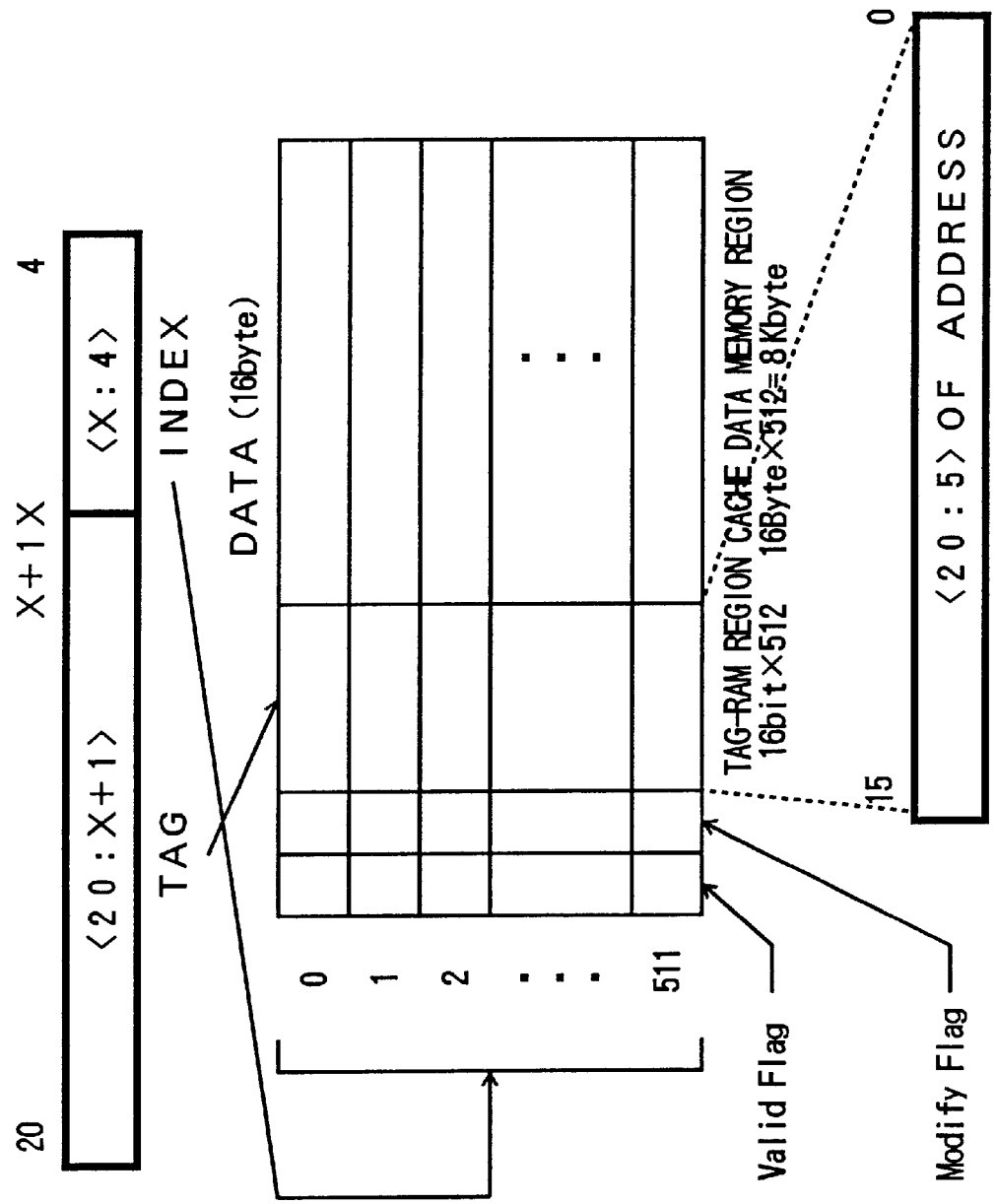

FIG. 8

| PARAMETER SETTING MODE | BIT_MSK [12:5] | CACHE_OFF |
|---|---|---|
| 0 | 0xFF | 1 |
| 1 | 0x7F | 1 |
| 2 | 0x3F | 1 |
| 3 | 0x1F | 1 |
| 4 | 0x0F | 1 |
| 5 | 0x07 | 1 |
| 6 | 0x03 | 1 |
| 7 | 0x01 | 1 |
| 8 | 0x00 | 1 |
| 9 | Don't care | 0 |

INFORMATION PROCESSING APPARATUS AND STORAGE MEDIUM

BACKGROUND OF THE INVENTION

1. Field of the Invention

The present invention generally relates to information processing apparatuses and storage mediums, and more particularly to an information processing apparatus which is designed to carry out a cache control or a DMA control by judging whether an input request is a cache control request or a DMA control request, and to a computer-readable storage medium which stores in a hardware description language circuit information which is used to design such an information processing apparatus by a computer.

2. Description of the Related Art

FIG. 1 is a system block diagram showing an example of a conventional information processing apparatus. The information processing apparatus includes a Reduced Instruction Set Computer (RISC) processor 201 for data processing, a cache memory 202, a signal processing digital signal processor (DSP) 203 for signal processing, a memory 204 with direct memory access (DMA), a memory bus 205, and a main storage part 206 which are coupled as shown in FIG. 1. For example, the RISC processor 201 is provided to carry out the data processing such as a communication protocol, and the DSP 203 is provided to carry out a high-speed signal processing. Recently, there is active development in media processing systems which carry out a high-speed signal processing with respect to image, audio, computer graphics and the like. An information processing apparatus having the RISC processor 201 and the DSP 203 provided on a single chip has also been proposed.

However, according to the information processing apparatus described above, the RISC processor 201 and the DSP 203 are provided independently of each other. For this reason, there was a problem in that the programming is difficult since independent instruction codes must be generated with respect to the RISC processor 201 and the DSP 203 when the user programs the information processing apparatus.

In addition, in order to make a high-speed access to a low-speed main storage part having a large storage capacity, a technique which is generally employed provides a high-speed memory having a small storage capacity between a processor and the main storage part, so as to form a cache memory system or a memory system with DMA. However, when the RISC processor 201 and the DSP 203 are provided as described above, it becomes necessary to form the cache memory system or the memory system with DMA independently with respect to the RISC processor 201 and the DSP 203. More particularly, it is necessary to provide a cache memory system which includes the cache memory 202 with respect to the RISC processor 201, and to provide a memory system with DMA which includes the memory 204 with DMA with respect to the DSP 203, independently of the cache memory system. For this reason, there was another problem in that the construction of the memory system becomes complex, and the cost of the entire information processing apparatus becomes high.

SUMMARY OF THE INVENTION

Accordingly, it is a general object of the present invention to provide a novel and useful information processing apparatus and storage medium, in which the problems described above are eliminated.

Another and more specific object of the present invention to provide an information processing apparatus which can efficiently process a cache control request and a DMA control request using a relatively simple and inexpensive construction, and a computer-readable storage medium which stores circuit information which is written in a hardware description language and is used to design such an information processing apparatus.

Still another object of the present invention is to provide an information processing apparatus comprising judging means for decoding an address of an input request and outputting a judgement signal which indicates whether the input request is a cache control request or a DMA control request, and control means for carrying out a cache control when the judgement signal from the judging means indicates the cache control request, and carrying out a DMA control when the judgement signal indicates the DMA control request. According to the information processing apparatus of the present invention, it is possible to efficiently process a cache control request and a DMA control request using a relatively simple and inexpensive construction.

The information processing apparatus may further comprise a single memory part including a first region which forms a cache memory part used for the cache control, and a second region which forms a data memory part used for the DMA control. The control means may include means for variably setting a ratio of the first and second regions based on a parameter. The memory part may have a multi-port structure. In addition, each part of the information processing apparatus may be provided on a single chip.

A further object of the present invention is to provide a computer-readable storage medium which stores circuit information in a hardware description language, comprising a first data region storing circuit information related to a judging means for decoding an address of an input request and outputting a judgement signal which indicates whether the input request is a cache control request or a DMA control request, and a second data region storing circuit information related to a control means for carrying out a cache control when the judgement signal from the judging means indicates the cache control request, and carrying out a DMA control when the judgement signal indicates the DMA control request. According to the computer-readable storage medium of the present invention, it is possible to make a computer efficiently process a cache control request and a DMA control request using a relatively simple and inexpensive construction.

Other objects and further features of the present invention will be apparent from the following detailed description when read in conjunction with the accompanying drawings.

BRIEF DESCRIPTION OF THE DRAWINGS

FIG. 5 is a diagram showing the relationship of a parameter setting mode, a number of cache indexes used, and an address;

FIG. 6 is a diagram for explaining the address structure;

FIG. 8 is a diagram showing a truth table used by a mask bit generating part;

DESCRIPTION OF THE PREFERRED EMBODIMENTS

Figure 1:
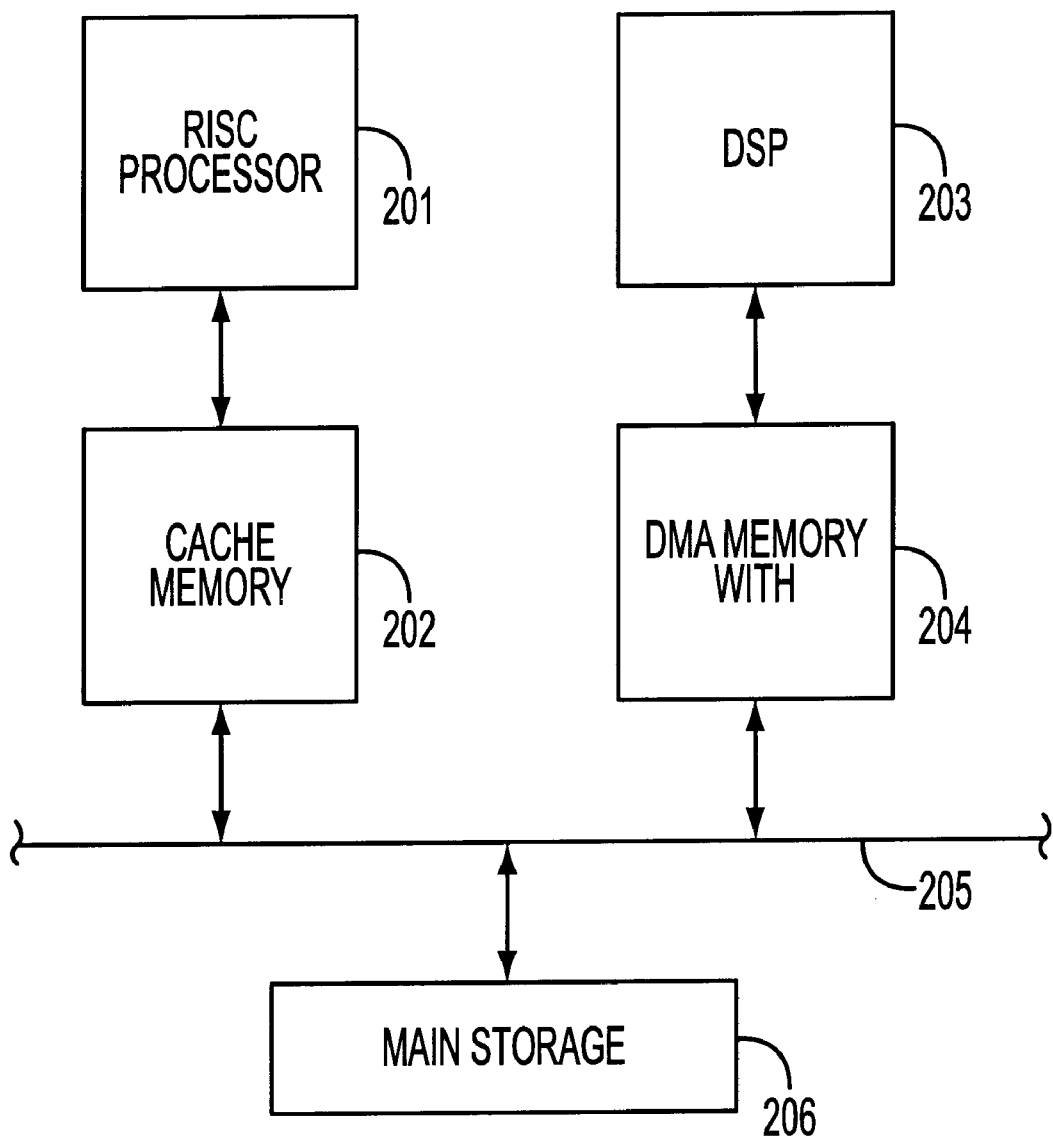
FIG. 1 is a system block diagram showing an example of a conventional information processing apparatus.

In the case of a RISC type instruction, the data to be treated, including a cache control request, cannot be predicted in most cases. On the other hand, in the case of a DSP type instruction, the data to be treated, including a DMA control request, can be predicted in most cases. Hence, if it were possible for the RISC type instruction and the DSP type instruction to coexist, it would be possible to use a memory for the instruction and a memory for the data, in common with respect to the RISC type instruction and the DSP type instruction. However, the characteristic of the data which is treated and the memory system which is used have the following substantial differences between the data processing and the signal processing.

If a sum of a parameter setting time for the DMA and a data transfer time by the DMA is smaller than a time in which the processor processes the transferred data, it is possible to operate the processor more efficiently by use of the memory system with DMA for the data processing. In other words, the data transfer can be carried out completely in parallel with the operation process. However, if the memory system with DMA is used for the data processing in a case where the data to be treated next cannot be predicted, the data transfer is carried out by setting the DMA parameters every time after the data which is to be treated is determined, and thus, the operation process and the data transfer are carried out in series.

On the other hand, if the cache memory system is used for the data processing, the operation process and the data transfer are carried out in series when the data which is to be treated does not exist within the cache memory. But in this case, it is possible to reduce the data transfer time because it is unnecessary to set the parameters.

Accordingly, if the cache memory system is used as a common memory system for the data, with respect to the RISC type instruction and the DSP type instruction, this arrangement is suited for the data processing, but the performance of the processor cannot be utilized efficiently for the signal processing because the operation process and the data transfer cannot be carried out in parallel. On the other hand, if the memory system with DMA is used as a common memory system for the data, with respect to the RISC type instruction and the DSP type instruction, this arrangement is suited for the signal processing, but the performance of the processor cannot be utilized efficiently for the data processing for the following reasons. That is, the data transfer time in the data processing becomes long when compared to the case where the cache memory system is employed, an instruction is always necessary to set the parameters for the DMA when a new data is to be treated, and the number of program steps increases.

Therefore, in the present invention, an information processing apparatus is constructed to include judging means for decoding an address of an input request and outputting a judgement signal which indicates whether the input request is a cache control request or a DMA control request, and control means for carrying out a cache control when the judgement signal from the judging means indicates the cache control request, and carrying out a DMA control when the judgement signal indicates the DMA control request.

Furthermore, in the present invention, a computer-readable storage medium which stores circuit information in a hardware description language, is constructed to include a first data region storing circuit information related to a judging means for decoding an address of an input request and outputting a judgement signal which indicates whether the input request is a cache control request or a DMA control request, and a second data region storing circuit information related to a control means for carrying out a cache control when the judgement signal from the judging means indicates the cache control request, and carrying out a DMA control when the judgement signal indicates the DMA control request.

Hence, according to the present invention, it is possible to efficiently process the cache control request and the DMA control request by use of a relatively simple and inexpensive construction.

Figure 2:
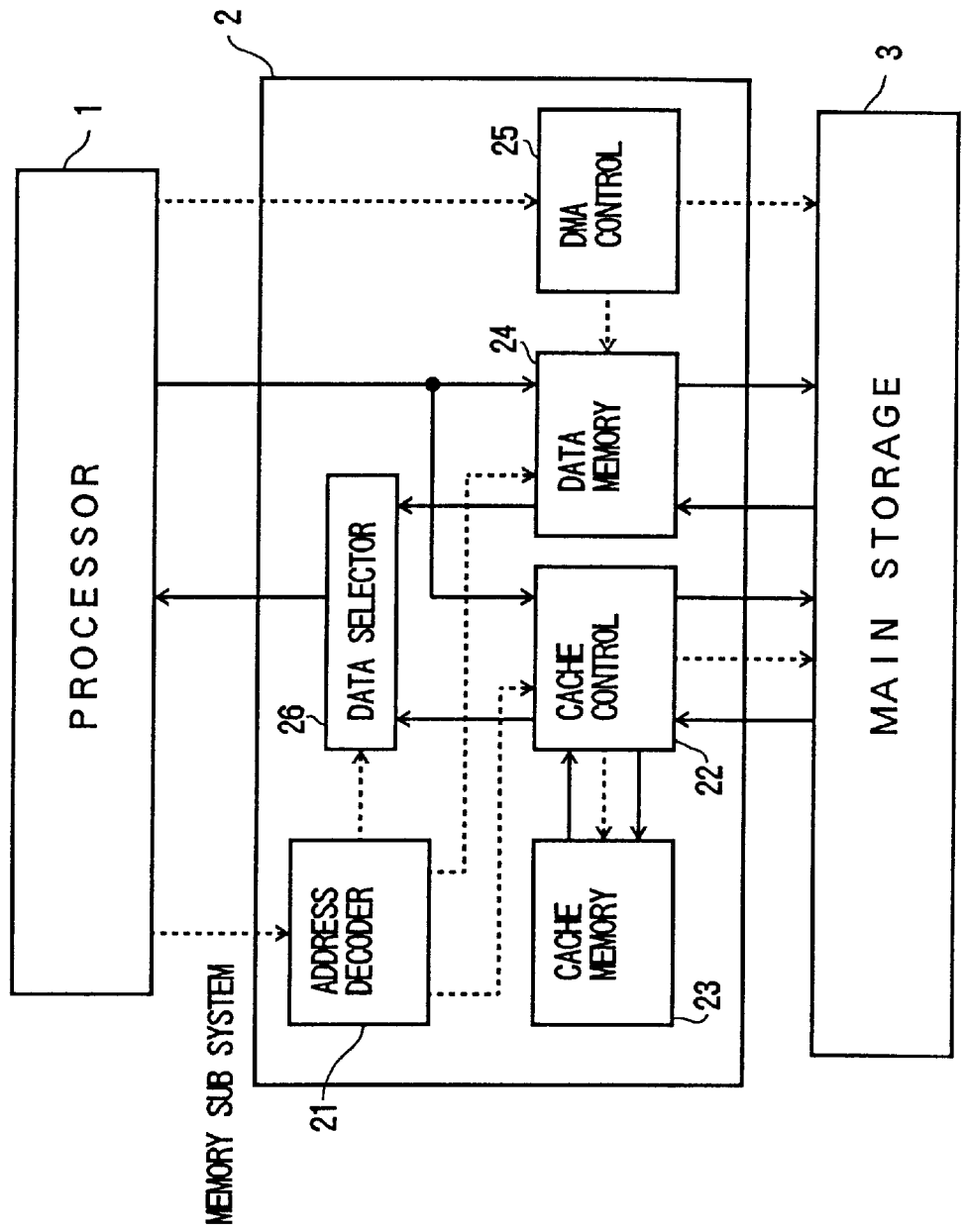
FIG. 2 is a system block diagram showing a first embodiment of an information processing apparatus according to the present invention.

FIG. 2 is a system block diagram showing a first embodiment of an information processing apparatus according to the present invention. The information processing apparatus includes a single processor part 1, a memory sub system 2, and a main storage part 3 which are connected as shown in FIG. 2. In FIG. 2, a dotted line indicates a flow of control signals including an address, and a solid line indicates a flow of data.

The processor part 1 generates a cache control request such as a RISC instruction which in most cases cannot predict the data to be treated, and a DMA control request such as a DSP instruction which in most cases can predict the data to be treated.

The memory sub system 2 includes an address decoder part 21, a cache control part 22, a cache memory part 23, a data memory part 24, a DMA control part 25, and a data selector part 26. The memory sub system 2 stores a part of the data of the main storage part 3, and supplies and accepts data in response to a request from the processor part 1.

The main storage part 3 has a known construction for storing a large amount of data.

The address decoder part 21 decodes an address of an input request from the processor part 1, and judges whether or not the input request is a request to the cache memory part 23 or a request to the data memory part 24. A judgement signal which indicates a result of this judgement and the input request are supplied to the cache control part 22, the data memory part 24 and the data selector part 26. More particularly, the address decoder part 21 supplies to the cache control part 22, the data memory part 24 and the data selector part 26 a control signal including an address, as the judgement signal which indicates the result of the judgement.

With respect to an access from the address decoder part 21, the cache control part 22 judges whether or not the address of the input request exists in the cache memory part 23, and makes a request with respect to the data of the cache memory part 23 if the address of the input request exists in the cache memory part 23. If the address of the input request exists in the cache memory part 23, it is found that the input request is a request to the cache memory part 23. If the request is a read request, the cache control part 22 reads the data at the corresponding address of the cache memory part 23, and supplies the read data to the data selector part 26. In addition, if the data of the corresponding address does not exist in the cache memory part 23, the requested data is read from the main storage part 3 and is stored in the cache memory part 23 before reading and supplying the data to the data selector part 26. On the other hand, if the request is a write request, the cache control part 22 writes the data supplied from the processor part 1 into the cache memory part 23.

The cache memory part 23 has a known construction for storing the data for cache. On the other hand, the data memory part 24 has a known construction for storing the data for DMA, and for enabling a multi-port access. In this embodiment, it is assumed for the sake of convenience that the data memory part 24 is made up of a known dual port memory which has a construction for enabling a dual port access.

With respect to the input request from the processor part 1, the DMA control part 25 occupies one port of the data memory part 24, and transfers the data from the main storage part 3 to the data memory part 24 or, transfers the data from the data memory part 24 to the main storage part 3.

Because the data memory part 24 has the dual port structure, an access from the DMA control part 25 and an access from the address decoder part 21 can be made independently with respect to the data memory part 24. With respect to the access from the address decoder part 21, the data memory part 24 uses another port which is not occupied by the DMA control part 25, to read the corresponding data and to supply the read data to the data selector part 26 in the case of a read request, and to write the data from the processor part 1 in the case of a write request.

If the input request from the processor part 1 is a read request, the data selector part 26 selectively supplies to the processor part 1 the data from the cache memory part 23 obtained via the cache control part 22 or the data from the data memory part 24, based on the control signal (that is, the judgement signal) which includes the address and is obtained from the address decoder part 21.

A cache memory system which includes the cache control part 22 and the cache memory part 23 is a kind of buffer memory provided to enable a high-speed access with respect to the main storage part 3 which has the large storage capacity. This cache memory system stores the data in the cache memory part 23 which enables a high-speed access, while maintaining an address space of the main storage part 3. Accordingly, the processor part 1 makes access to the cache memory part 23 using an address value of the address space of the main storage part 3.

On the other hand, a memory system with DMA, which includes the DMA control part 25 and the data memory part 24, exists in an address space different from that of the main storage part 3, and stores copies of the data in the main storage part 3, the data generated by the processor part 1 and the like. For this reason, the processor part 1 makes access to the data memory part 2 using an address value of an address space different from that of the main storage part 3.

By distinguishing the memory accesses from the processor part 1 by the address space, it is possible to form the memory sub system 2 in which the cache memory system and the memory system with DMA coexist. The address decoder part 21 can generate the judgement signal described above by making a simple judgement, such as judging the request as being a request to the cache memory system if the address is less than or equal to a predetermined value and judging the request as being a request to the memory system with DMA if the address is greater than the predetermined value.

According to this embodiment, a peak performance and a practical performance of the processor part 1 can be made approximately the same, and it is possible to construct an information processing apparatus in which the processor part 1 is not stopped by the data supply.

Figure 3:
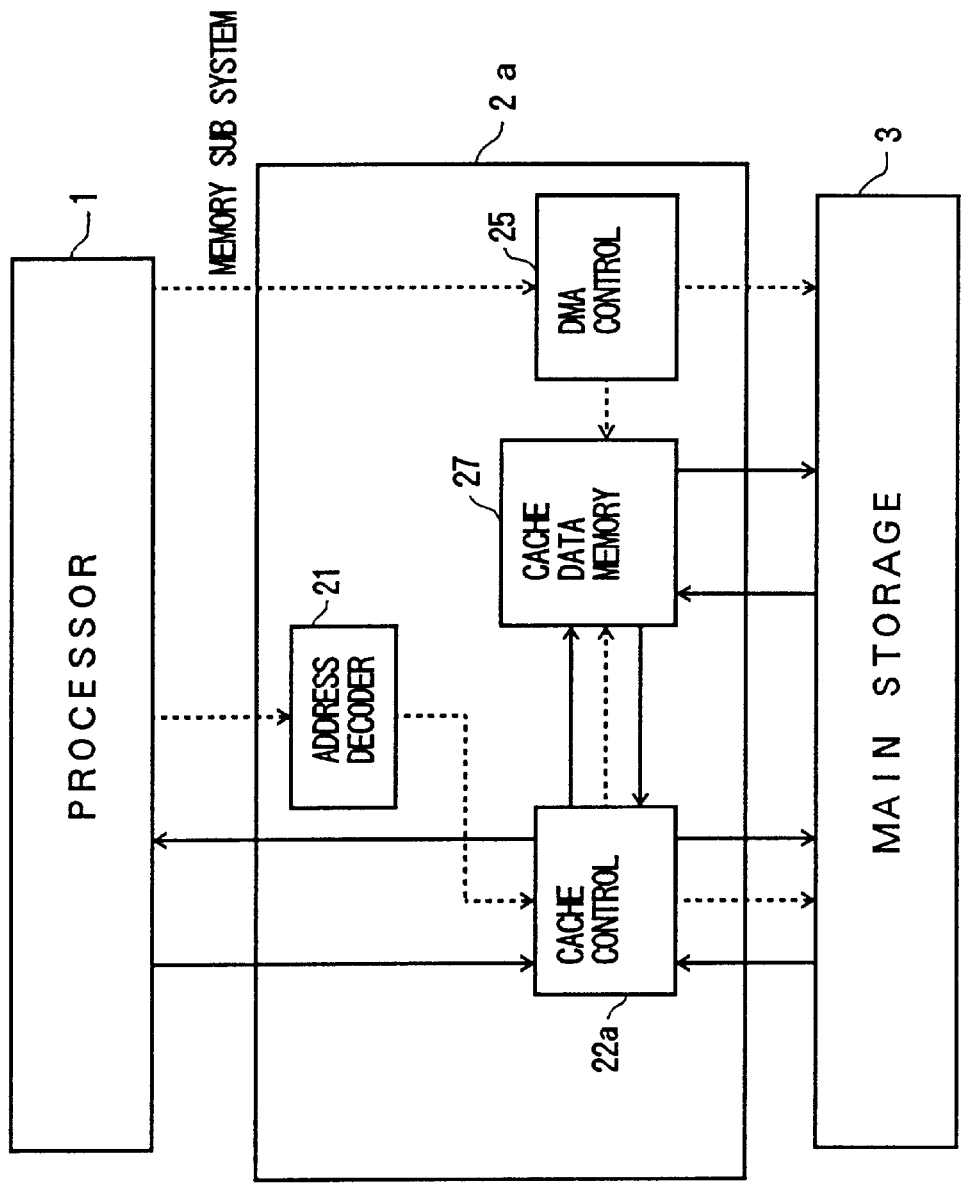
FIG. 3 is a system block diagram showing a second embodiment of the information processing apparatus according to the present invention.

Next, a description will be given of a second embodiment of the information processing apparatus according to the present invention. FIG. 3 is a system block diagram showing the second embodiment of the information processing apparatus. In FIG. 3, those parts which are the same as those corresponding parts in FIG. 2 are designated by the same reference numerals, and a description thereof will be omitted.

A memory sub system 2a includes the address decoder part 22, a cache control part 22a, the DMA control part 25, and a cache data memory part 27 which are connected as shown in FIG. 3.

The cache data memory part 27 functions as the cache memory part 23 and the data memory part 24 shown in FIG. 2, and has a construction which enables a multi-port access. In this embodiment, the cache data memory part 27 has a construction which enables a dual port access. A memory region of the cache data memory part 27 is fixedly divided into a first memory region used by the cache control part 22a, and a second memory region used by the DMA control part 25.

The address decoder part 21 decodes the address of the input request from the processor part 1 depending on the division of the memory region of the cache data memory part 27, and judges whether the input request is a request to the first memory region or a request to the second memory region. The input request and a judgement signal which indicates a result of this judgement made in the address decoder part 21 are supplied to the cache control part 22a. More particularly, the address decoder part 21 supplies to the cache control part 22a a control signal including the address as the judgement signal which indicates the judgement result.

With respect to the access from the address decoder part 21, the cache control part 22a judges whether the address of the input request exists in the first memory region of the cache data memory part 27, and makes a request with respect to the data in the first memory region if the address of the input request exists in the first memory region. If the address of the input request exists in the first memory region, it is found that the input request is a cache control request. In the case where the input request is a read request, the cache control part 22a reads the data from a corresponding address within the first memory region of the cache data memory part 27, and supplies the read data to the processor part 1 via the cache control part 22a. In addition, if the data at the corresponding address does not exist within the first memory region of the cache data memory part 27, the requested data is read from the main storage part 3 and is stored in the first memory region of the cache data memory part 23, and the data is thereafter read from the first memory region and supplied to the processor part 1 via the cache control part 22a. On the other hand, in the case where the input request is a write request, the cache control part 22a writes to the first memory region of the cache data memory part 23 the data which is supplied from the processor part 1 via the cache control part 22a.

The DMA control part 25 occupies one port of the cache data memory part 27 with respect to the input request from the processor part 1, and transfers the data from the main storage part 3 to the second memory region of the cache data memory part 27 or, transfers the data from the second memory region of the cache data memory part 27 to the main storage part 3.

Because the cache data memory part 27 has the dual port structure, it is possible to independently make an access from the DMA control part 25 and an access from the address decoder part 21. With respect to the access from the address decoder part 21, the cache data memory part 27 uses one port which is not occupied by the DMA control part 25, and reads the corresponding data from the second memory region and supplies the read data to the processor part 1 via the cache control part 22a in the case of the read request, and writes the data from the processor part 1 to the second memory region in the case of the write request.

In this embodiment, the single cache data memory part 27 is used in place of the cache memory part 23 and the data memory part 24 shown in FIG. 2. Hence, it is unnecessary to provide the data selector part 26 shown in FIG. 2. In the case where the input request from the processor part 1 is a read request, the data read from the first or second memory region of the cache data memory part 27 can be supplied directly to the processor part 1.

According to this embodiment, the peak performance and the practical performance of the processor part 1 can be made approximately the same, and it is possible to construct an information processing apparatus in which the processor part 1 is not stopped by the data supply.

Figure 4:
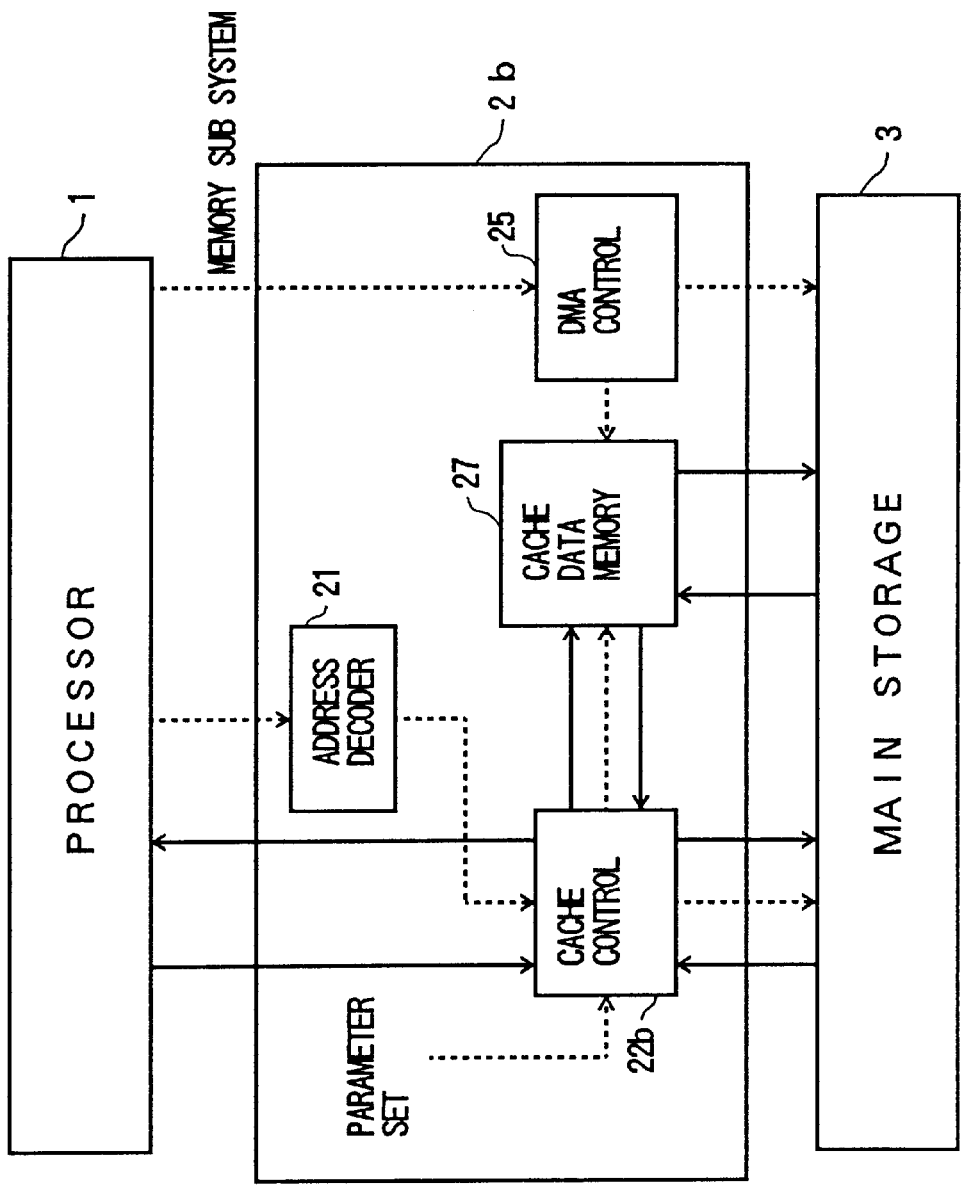
FIG. 4 is a system block diagram showing a third embodiment of the information processing apparatus according to the present invention.

Next, a description will be given of a third embodiment of the information processing apparatus according to the present invention. FIG. 4 is a system block diagram showing the third embodiment of the information processing apparatus. In FIG. 4, those parts which are the same as those corresponding parts in FIG. 3 are designated by the same reference numerals, and a description thereof will be omitted.

A memory sub system 2b includes the address decoder part 21, a cache control part 22b, the DMA control part 25, and a cache data memory part 27 which are connected as shown in FIG. 4.

In this embodiment, a memory region of the cache data memory part 27 can be arbitrarily divided into a first memory region which is used by the cache control part 22b and a second memory region which is used by the DMA control part 25.

A method of setting parameters with respect to the cache control part 22b is not limited to a specific method, as long as parameters related to a ratio of the first memory region and the second memory region within the cache data memory part 27 is supplied to the cache control part 22b. For example, the parameters may be supplied directly to the cache control part 22b from outside the memory sub system 2b or the processor part 1 or, the parameters may be supplied directly to the cache control part 22b by reading the parameters from a register set from outside the memory sub system 2b or the processor part 1. In addition, when using such a register, this register may be provided within the memory sub system 2b, provided outside the memory sub system 2b or, provided within the cache control part 22b.

According to this embodiment, it is possible to construct an information processing apparatus suited for various media processing applications, by variably setting the ratio of the first and second memory regions depending on the usage of the information processing apparatus. Further, the peak performance and the practical performance of the processor part 1 can be made approximately the same, and it is thus possible to construct an information processing apparatus in which the processor part 1 is not stopped by the data supply.

FIGS. 5 and 6 are diagrams for explaining a method of arbitrarily dividing the memory region of the cache data memory part 27 into the first memory region used by the cache control part 22b and the second memory region used by the DMA control part 25, by variably setting a hash function of the cache data memory part 27. FIG. 5 is a diagram showing the relationship of a parameter setting mode, number of cache indexes used, and the address. FIG. 6 is a diagram for explaining the address structure.

In this embodiment, a variable cache algorithm uses the following parameters.

direct mapping system an address adr[20:0] in units of bytes is used as the address 1 cache line is made up of 16 bytes a memory capacity of the cache data memory part 27 is 8 kbytes a memory capacity of the main storage part 3 is 2 Mbytes a memory capacity of a TAG-RAM which stores an address value and will be described later is 1 kbyte a data defined flag (Valid) which will be described later is used a data rewrite flag (Modify) which will be described later is used As shown in FIG. 5, the hash function has 10 parameter setting modes "0" go through "9". For example, in the case of the parameter setting mode "0", the entire memory region of the cache data memory part 27 is used as the cache memory part, and the flags and the RAG-RAM described above use the entire memory region because the number of indexes used is 512 (0 through 511). In addition, in the case of the parameter setting mode "1", 4 kbytes of the memory region of the cache data memory part 27 are used as the cache memory part while the remaining 4 kbytes are used as the data memory part, and the flags and the TAG-RAM described above use one-half the memory region because the number of indexes used is 256 (0 through 255). In other words, when the parameter setting mode is "1", the memory region of the cache data memory part 27 corresponding to the indexes 256 through 511 is used as the data memory part when making the data transfer by DMA. Furthermore, when the parameter setting mode is "9", the entire memory region of the cache data memory part 27 is used as the data memory part, and the cache data memory part 27 is in a cache off state.

FIG. 6 is a diagram showing the relationship of the address structure and the index shown in FIG. 5. In the address, an address portion adr[3:0] is used for the byte selection, and an address portion adr[20:4] has the structure shown in FIG. 6. In the address portion [20:4], the indexes 0 through 511 are indicated by adr[X:4], and the defined flag (Valid), the rewrite flag (Modify), the TAG-RAM region and the cache data memory region are provided with respect to each index. X takes values 12 through 4 with respect to the parameter setting modes "0" through "8", and the parameter setting mode "9" corresponds to the cache off state. The TAG-RAM region has a memory capacity of 16 (bits)× 512≈1 (kbyte), and the cache data memory region has a memory capacity of 16 (bytes)×512≈8 (kbytes).

Figure 7:
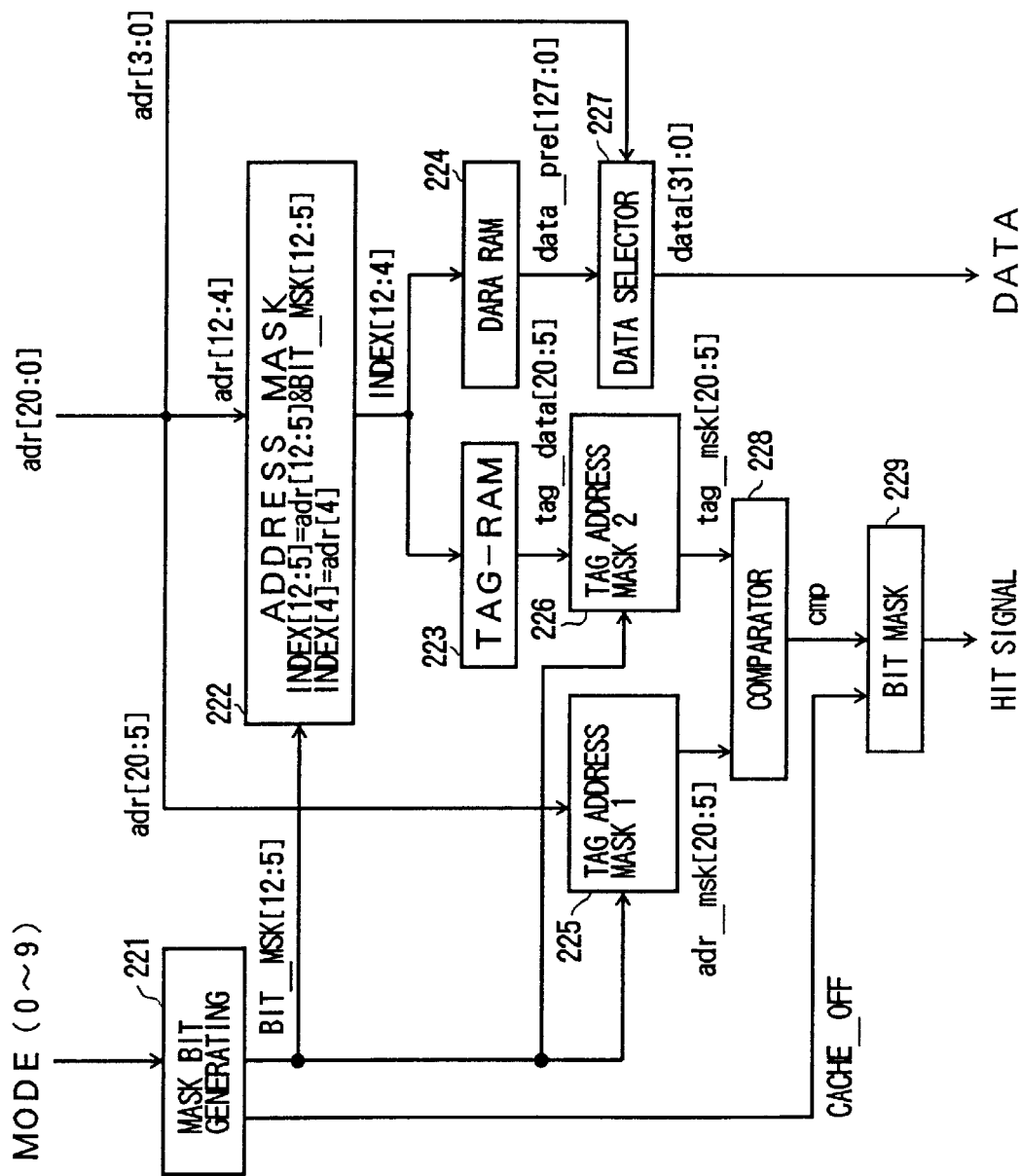
FIG. 7 is a system block diagram showing the construction of a cache control part of the third embodiment.

FIG. 7 is a system block diagram showing the construction of the cache control part 22b of this embodiment. The cache control part 22b includes a mask bit generating part 221, an address mask part 222, a TAG-RAM 223, a data RAM 224, a TAG address mask parts 225 and 226, a data selector part 227, a comparator part 228, and a bit mask part 229 which are connected as shown in FIG. 7.

A mode signal which indicates one of the parameter setting modes "0" through "9" is input to the mask bit generating part 221. The mask bit generating part 221 generates a cache off signal CACHE_OFF and a bit mask signal BIT_MASK[12:5] corresponding to the parameter setting mode indicated by the mode signal, based on a truth table shown in FIG. 8. The bit mask signal BIT_MASK [12:5] is supplied to the address mask part 222 and the TAG address mask parts 225 and 26. The cache off signal CACHE_OFF is supplied to the bit mask part 229.

The address portion adr[12:4] of the address adr[20:0] input to the cache control part 22b is input to the address mask part 222. The address portion adr[20:5] of the address adr[20:0] is input to the TAG address mask part 225, and the address portion adr[3:0] of the address adr[20:0] is input to the data selector part 227. The address mask part 222 obtains a logical product (AND) in units of bits between the bit mask signal BIT_MASK[12:5] and the address portion adr[12:5], and outputs an index INDEX[12:5], and also passes through the address portion adr[4] as it is and outputs this address portion adr[4] as an index INDEX[4]. The index INDEX [12:5] which is obtained as a result of the AND in the address mask part 222 is supplied to the data RAM 224. On the other hand, the INDEX[4] which is passed through the address mask part 222 is supplied to the TAG-RAM 223.

The TAG address mask part 225 obtains an AND in units of bits between the address portion adr[12:5] and the bit mask signal BIT_MASK[12:5], and outputs an address mask adr_msk[12:5]. The TAG address mask part 225 passes through the address portion [20:13] as it is, and outputs this address portion [20:13] as an address mask adr_msk[20:13].

The TAG address mask part 226 obtains an AND in units of bits between a tag data tag_data[12:5] from the TAG-RAM 223 and the bit mask signal BIT_MASK[12:5], and outputs a tag mask tag_msk[12:5]. In addition, the TAG address mask part 226 passes through a tag data tag_data [20:13] from the TAG-RAM 223 as it is, and outputs this tag data tag_data[20:13] as a tag mask tagmsk[20:13].

The comparator part 228 compares the address mask adr_msk[20:5] from the TAG address mask part 225 and the tag mask tag_msk[20:5] from the TAG address mask part 226, and outputs a signal cmp=1 if the two match, and outputs a signal cmp=0 if the two do not match.

The bit mask part 229 obtains an AND of the cache off signal CACHE_OFF from the mask bit generating part 221 and the signal cmp from the comparator part 228, and outputs a result of this AND as a hit signal. This hit signal indicates whether or not the memory region of the cache data memory part 27 is to be used as the first memory region, that is, as the cache memory part. This hit signal is supplied to the cache data memory part 27.

The data selector part 227 selects a 32-bit data from the 128-bit data data_pre[127:0] which is output from the data RAM 224, based on the value of the address portion adr[3:0]. The selected 32-bit data is supplied to the cache data memory part 27

Figure 9:
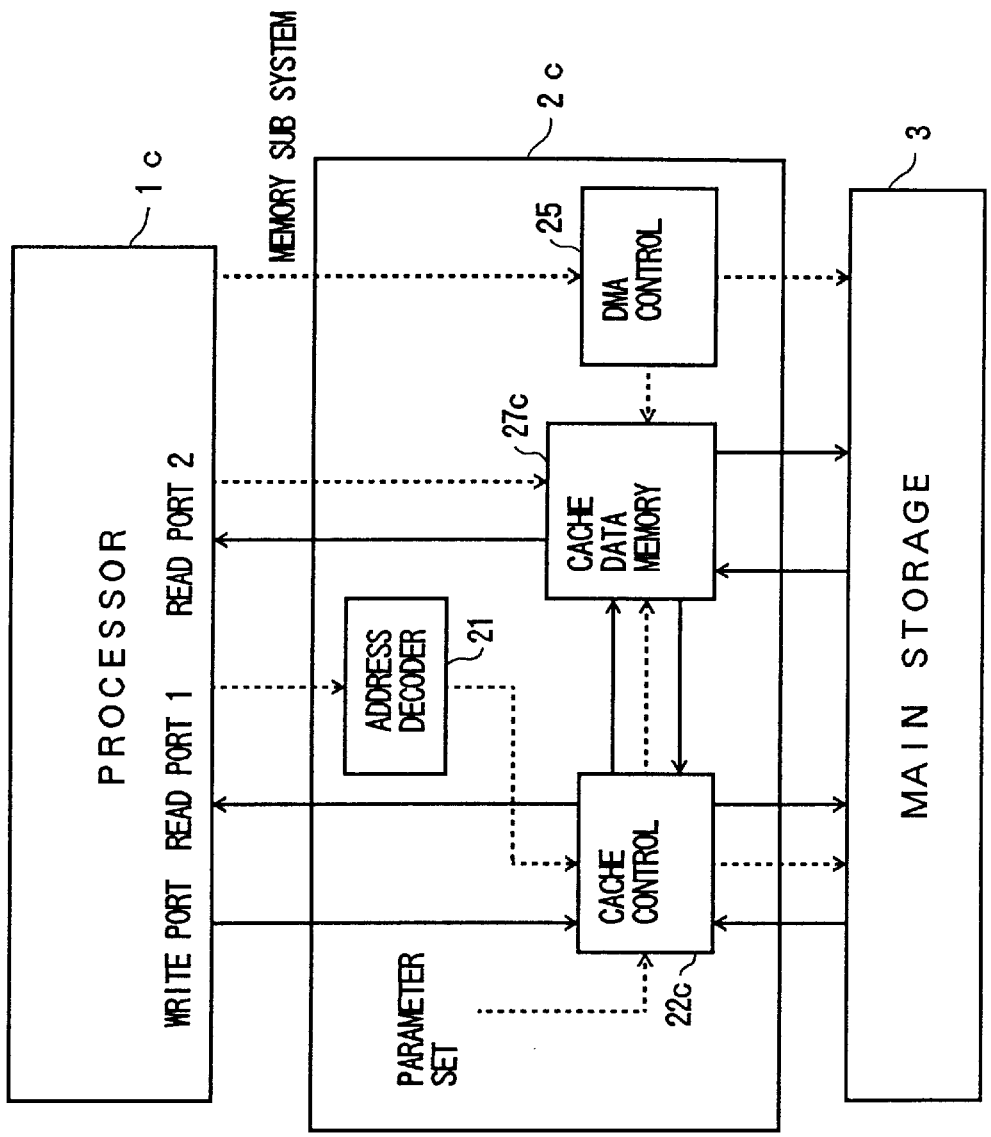
FIG. 9 is a system block diagram showing a fourth embodiment of the information processing apparatus according to the present invention.

Next, a description will be given of a fourth embodiment of the information processing apparatus according to the present invention. FIG. 9 is a system block diagram showing the fourth embodiment of the information processing apparatus. In FIG. 9, those parts which are the same as those corresponding parts in FIG. 4 are designated by the same reference numerals, and a description thereof will be omitted.

A processor part 1c has a plurality of read ports. In addition, a memory sub system 2c includes the address decoder part 21, a cache control part 22c, the DMA control part 25, and a cache data memory part 27c which are connected as shown in FIG. 9. The cache data memory part 27c has a multi-port structure matching the number of ports of the processor part 1c.

With respect to the access from the address decoder part 21, the cache control part 22c judges whether or not the address of the input request exists in the first memory region of the cache data memory part 27c, and makes a request with respect to the data in the first memory region if the address exists in the first memory region. If the address of the input request exists in the first memory region, it is found that the input request is a cache control request. In the case where the input request is a read request, the cache control part 22c reads the data from the corresponding address within the first memory region of the cache data memory part 27c, and supplies the read data directly to the processor part 1c. In addition, if the data at the corresponding address does not exist in the first memory region of the cache data memory part 27c, the requested data is read from the main storage part 3 and stored in the first memory region of the cache data memory part 23c, and the data is thereafter read from the first memory region and supplied directly to the processor part 1c. On the other hand, in the case where the input request is a write request, the cache control part 22c writes the data supplied from the processor part 1c into the first memory region of the cache data memory part 23c.

Because the cache data memory part 27c has the multi-port structure, it is possible to independently make an access from the DMA control part 25 and an access from the address decoder part 21. With respect to the access from the address decoder part 21, the cache data memory part 27c uses one port not occupied by the DMA control part 25, and in the case of a read request reads the corresponding data from the second memory region and supplies the read data directly to the processor part 1c, and in the case of a write request writes the data from the processor part 1c to the second memory region.

In this embodiment, the processor part 1c has a plurality of read ports, and the cache data memory part 27c has a multi-port structure matching the number of ports of the processor part 1c. For this reason, it is possible to make an access to the memory sub system 2c without interfering with the operation process of the processor part 1c.

In other words, in a signal processing, an appropriate operation process is carried out with respect to the data which are successively input, and a result of the process is output. Accordingly, there exists little data which have the possibility of being reused, and as in the case of a normal RISC processor, the practical performance deteriorates with respect to the peak performance of the processor, since an instruction for making a transfer from the memory to the register is always required before the operation process in the case of the architecture which carries out the register-based operation process. In addition, even in the case where there exists data which have a high possibility of being reused, the amount of data is more than the amount which can be stored in the small number of registers within the processor, and consequently, a register transfer instruction is always required.

But according to this embodiment, the data from the cache data memory part 27c can be used directly for the operation, thereby making it possible to improve the processor architecture. In addition, by providing two or more read ports, that is, data input ports, of the processor part 1c, and by constructing the cache data memory part 27c to have a multi-port structure, it is possible to construct an information processing apparatus in which the operation process is not interfered by the data supply. Furthermore, because the register transfer instruction can be omitted, it is possible to reduce the number of instruction steps and to improve the practical performance of the processor part 1c.

Figure 10:
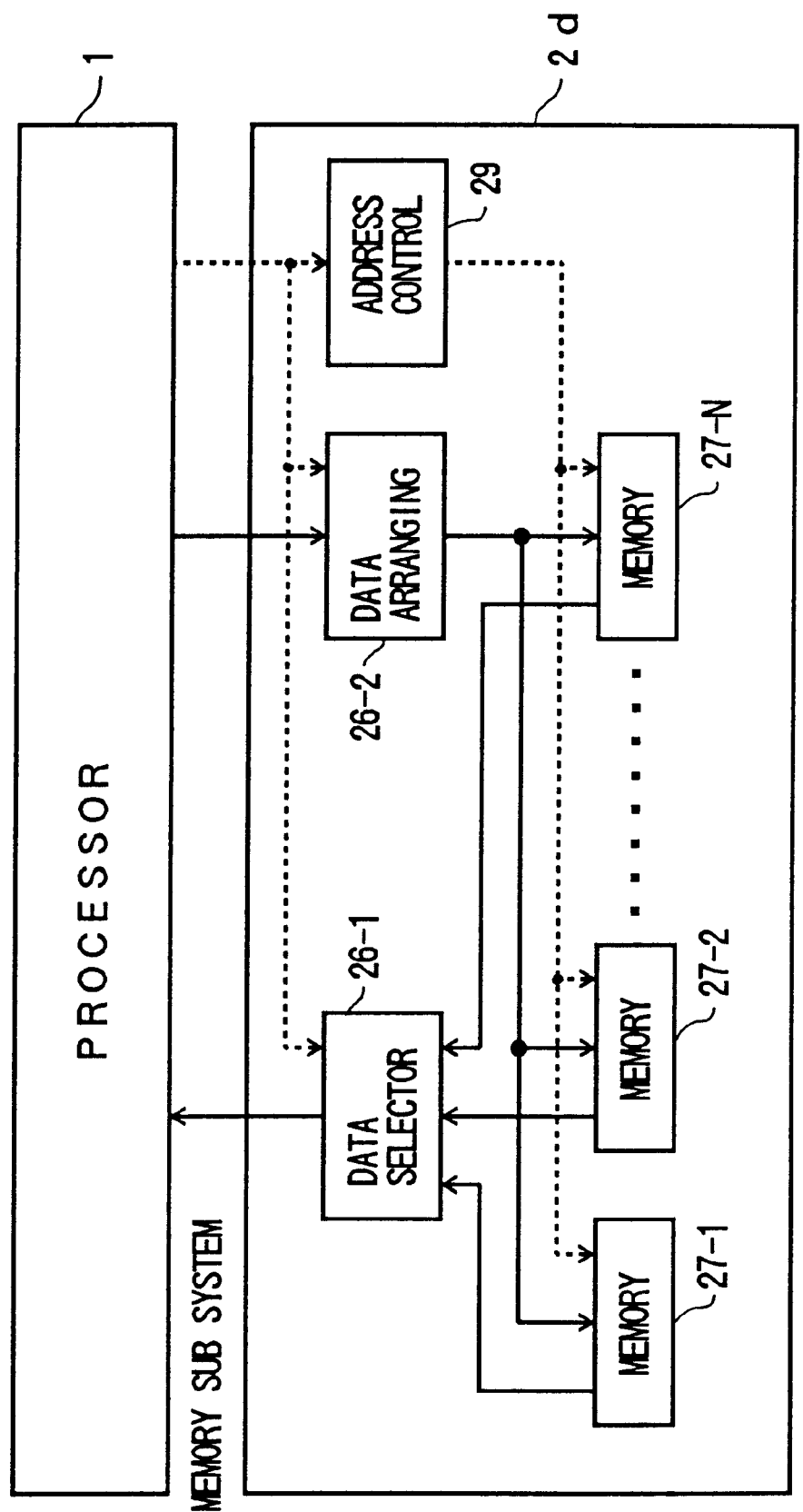
FIG. 10 is a system block diagram showing a fifth embodiment of the information processing apparatus according to the present invention.

Next, a description will be given of a fifth embodiment of the information processing apparatus according to the present invention. FIG. 10 is a system block diagram showing the fifth embodiment of the information processing apparatus. In FIG. 10, those parts which are the same as those corresponding parts in FIG. 2 are designated by the same reference numerals, and a description thereof will be omitted.

A memory sub system 2d includes a data selector part 26-1, a data arranging part 26-2, N memory parts 27-1 through 27-N, and an address control part 29 which are connected as shown in FIG. 10. In FIG. 10, the illustration of the main storage part 3 is omitted.

The N memory parts 27-1 through 27-N form a first region which is used as a cache memory part by the cache control, and a second region which is used as a data memory part by the DMA control. Each of the memory parts 27-1 through 27-N has a data width L which is less than or equal to a maximum data width M of the request from the processor part 1, where L, N and M are integers satisfying $LN \geq 2M$.

In the case where the input request from the processor part 1 is a read request, the data selector part 26-1 selectively outputs to the processor part 1 the data corresponding to the decoded address from among the data read from the memory parts 27-1 through 27-N based on the address decoded by the address control part 29. In addition, in the case where the input request from the processor part 1 is a write request, the data arranging part 26-2 writes the data from the processor part 1 to a corresponding position within the memory parts 27-1 through 27-N, based on the address decoded by the address control part 29.

In this embodiment, the address from the processor part 1 is not the same as the memory access data width of the processor part 1, but is an address in units of bytes. Hence, the memory sub system 2d is constructed so that it is possible to access the data having the memory access data width of the processor part 1 from an arbitrary byte address. For this reason, it is possible to always treat consecutive data including the data requested by the processor part 1, and to read the data from an arbitrary byte address and supply the read data the processor part 1. Moreover, by controlling the write in units of bytes also at the time of writing data, it is possible to write the data to an arbitrary byte address.

By the improvement of the processor architecture, the processor can carry out the signal processing at a high speed by carrying out 2, 4 or more operations in parallel. But if the conventional memory system with DMA shown in FIG. 1 is employed in this processor, there is a limit in treating the data. In other words, although the performance is improved in the operation process part by the parallel operation process, it is necessary to carry out a data shaping process instruction before carrying out the operation process, and a considerable improvement of the operation process as a whole cannot be expected.

That is, the data width treated in the signal processing of audio, graphic, image and the like is 8 bits or 16 bits, for example, and a processor which can treat 32 bits of data at one time can carry out 4 parallel operation processes of 8 bits or 2 parallel operation processes of 16 bits. A processor which can treat 64 bits of data at one time can carry out 8 parallel operation processes of 8 bits or 4 parallel operation processes of 8 bits. Hence, the operation capability can be improved using such a processor. However, in an image filtering process and the like, 4 parallel operation processes may be carried out with respect to the data of 4 pixels and the data of 4 pixels located at a position shifted by 1 pixel therefrom, for example. In such a case, it is necessary to carry out a data shaping process, as a pre-processing, prior to carrying out the 4 parallel operation processes, thereby reducing the effects of the 4 parallel operation processes. More particularly, the memory system with DMA has a memory bit width and address matching the data width of the processor, and if the data width of the processor is 32 bits, for example, the memory is constructed to have a memory bit width of 32 bits. Thus, if it is necessary to obtain a 32-bit data spanning 2 consecutive addresses of the memory, it is necessary to carry out a so-called pack processing in which the processor reads the data of 2 consecutive addresses and thereafter extracts and processes the necessary data from the read data.

On the other hand, according to this embodiment, a process corresponding to the data shaping process such as the so-called pack processing is efficiently carried out within the memory sub system 2d when reading the data or writing the data. Therefore, it is possible to omit the data shaping process instruction, and extremely satisfactory effects are achieved by the 2 parallel operation processes, 4 parallel operation processes and the like.

In a case where the read request from the processor part 1 is generated at 2 or more ports, the memory parts 27-1 through 27-N within the memory sub system 2d may be constructed to have the multi-port structure, similarly to the relationship of the processor part 1c and the cache data memory part 27c shown in FIG. 8, so that it is possible to immediately cope with the data requests from the processor part 1.

Figure 11:
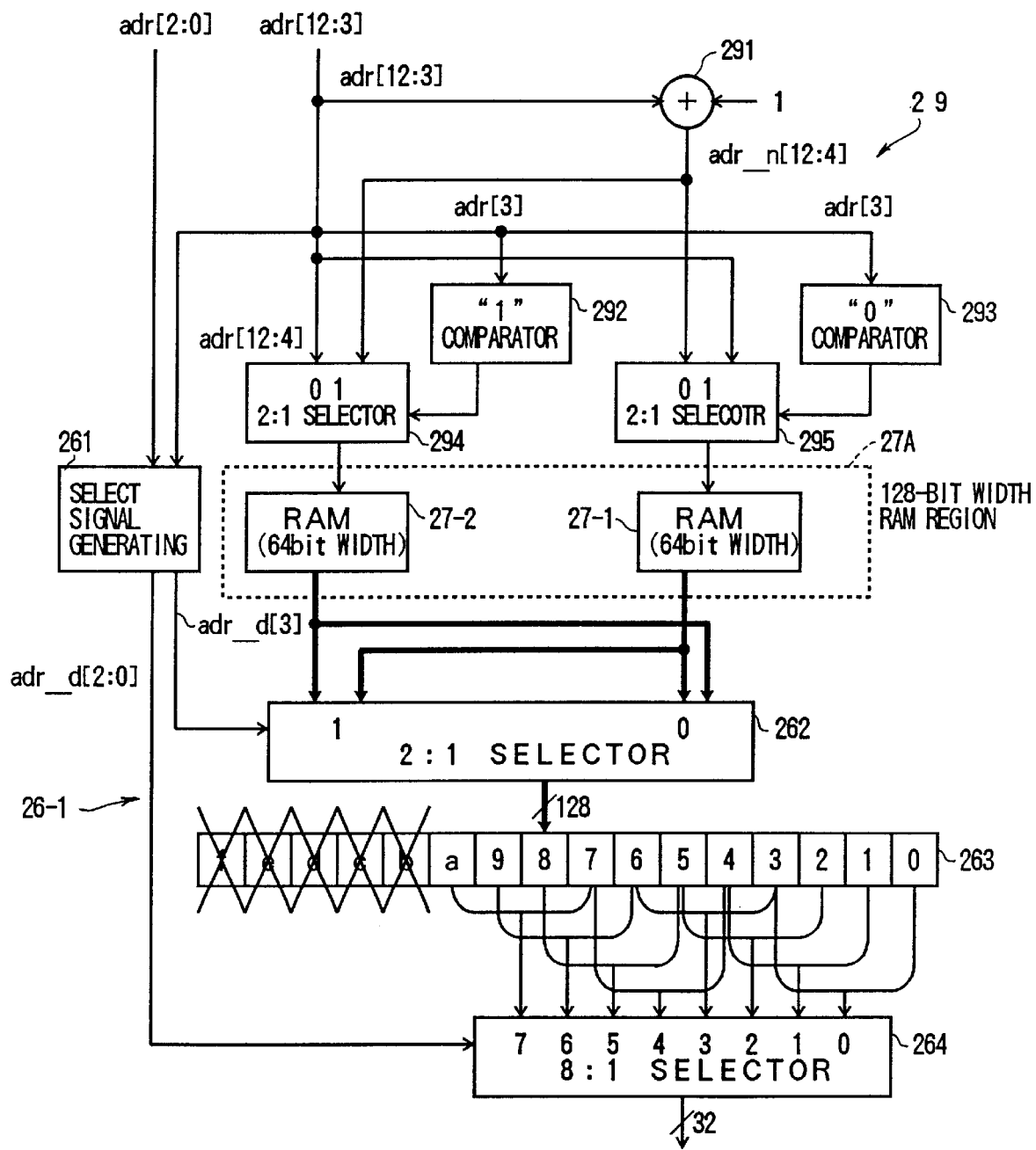
FIG. 11 is a system block diagram showing the construction of a data selector part together with related parts of an address control part and a memory part.
Figure 12:
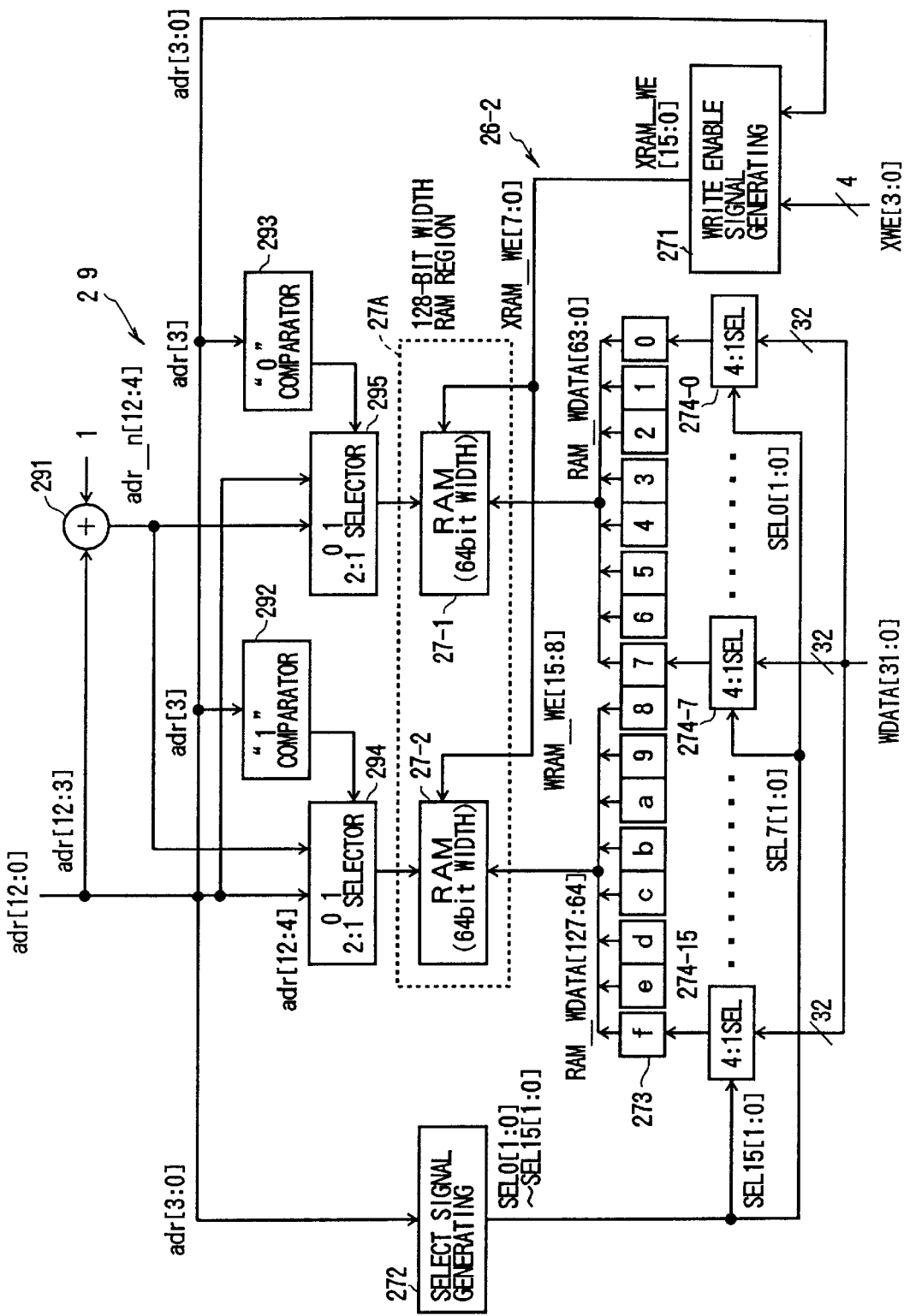
FIG. 12 is a system block diagram showing the construction of a data arranging part together with related parts of the address control part and the memory part.

FIG. 11 is a system block diagram showing the construction of the data selector part 26-1 together with the related parts of the address control part 29 and the memory parts 27-1 through 27-N. FIG. 12 is a system block diagram showing the construction of the data arranging part 26-2 together with the related parts of the address control part 29 and the memory parts 27-1 through 27-N. For the sake of convenience, FIGS. 11 and 12 show a case where N=2.

In FIG. 11, the address control part 29 includes an adder 29a, comparators 292 and 293, and 2:1 selectors 294 and 295. Each of the memory parts 27-1 and 27-2 is made up of a RAM having a bit width of 64 bits, and forms a RAM region 27A having a bit width of 128 bits. The data selector 26-1 includes a select signal generating part 261, a 2:1 selector 262, a register 263, and a 8:1 selector 264.

In the case where the input request from the processor part 1 is a read request, the adder 291 increments adr[12:3] of the address adr[12:0] from the processor part 1 by 1, and supplies an address adr_n[12:4] to a "1" input terminal of the selector 294 and to a "0" input terminal of the selector 295. In addition, adr[3] of adr[12:3] is supplied to the "1" comparator 292, the "0" comparator 293 and the select signal generating part 261. On the other hand, adr[12:4] of adr[12:3] is supplied to a "0" input terminal of the selector 294, a "1" input terminal of the selector 295, and the select signal generating part 261. The select signal generating part 261 is also supplied with adr[2:0]. Accordingly, if adr[3] is 1, the selector 294 inputs to the memory part 27-2 the adr_n[12:4] supplied to the "1" input terminal of the selector 294, in response to the output of the "1" comparator 292. Further, if adr[3] is 0, the selector 295 inputs to the memory part 27-1 the adr_n[12:4] supplied to the "0" input terminal of the selector 295, in response to the output of the "0" comparator 293. Therefore, if adr[3] is 1, for example, the selector 294 inputs to the memory part 27-2 the adr_n[12:4] supplied to the "1" input terminal of the selector 294 in response to the output of the "1" comparator 292, and the selector 295 inputs to the memory part 27-1 the adr[12:4] supplied to the "1" input terminal of the selector 295 in response to the output of the "0" comparator 293. As a result, data having a bit width of 128 bits in total are read from 2 consecutive addresses of the memory parts 27-1 and 27-2 and supplied to the selector 262.

The select signal generating part 261 generates a select signal adr_d[3] based on the adr[3], and supplies this select signal adr_d[3] to the selector 262. The selector 262 supplies to the register 263 a data having a bit width of 128 bits from the RAM region 27A, in response to the select signal adr_d[3]. This register 263 supplies combines the data having the bit width of 128 bits and supplies 8 kinds of data having the bit width of 32 bits to the selector 264. The select signal generating part 261 generates a select signal adr_d[2:0] based on adr[2:0]₁, and supplies the select signal adr_d[2:0] to the selector 264. With respect to the processor part 1, the selector 264 outputs 1 corresponding kind of data having the bit width of 32 bits in response to the select signal adr_d[2:0].

In FIG. 12, those parts which are the same as those corresponding parts in FIG. 11 are designated by the same reference numerals, and a description thereof will be omitted. In FIG. 12, the data arranging part 26-2 includes a write enable signal generating part 271, a select signal generating part 272, a register 273, and 4:1 selectors 274-0 through 274-15.

In the case where the input request from the processor part 1 is a write request, the write enable signal generating part 271 generates a write enable signal XRAM_WE[15:0] based on the address adr[3:0] and a write enable signal XWE[3:0] from the processor part 1, and supplies a write enable signal XRAM_WE[7:0] to the memory part 27-1 and supplies a write enable signal XRAM_WE[15:8] to the memory part 27-2. When adr[3:0]=0 in this embodiment, XWE[3:0] is connected to XRAM_WE[3:0], and other XRAM_WE are all set to 1. On the other hand, when adr[3:0]=1, XWE[3:0] is connected to XRAM_WE[4:1], and other XRAM_WE are all set to 1. Hence, the connection of XWE[:0] is shifted depending on the address, while the other XRAM_WE are all set to 1.

A 32-bit write data WDATA[31:0] from the processor part 1 is supplied to each of the selectors 274-0 through 274-15. The select signal generating part 272 generates select signals SEL0[1:0] through SEL15[1:0] indicating which of the 4 bytes of the write data WDATA[31:0] is to be selected, based on the address adr[3:0], and supplies the select signals SEL0[1:0] through SEL15[1:0] to the corresponding selectors 274-0 through 274-15.

For example, when the byte "7" is observed, the select signal generating part 272 generates the select signal SEL0[1:0] through SEL15[1:0], so that the selectors 274-0 through 274-15 select the write data WDATA[31:24] when adr[3:0]=4, select the write data WDATA[23:16] when adr[3:0]=5, select the write data WDATA[15:8] when adr[3:0]=6, select the write data WDATA[7:0] when adr[3:0]=7. With respect to other address values, it is possible to control the write enable signal XRAM_WE[15:0] which is generated by the write enable signal generating part 271 so that the write data WDATA[31:0] will not be written into the memory parts 27-1 and 27-2. Hence, a default may be determined depending on the write data to be selected.

The write data from the selectors 274-0 through 274-15 are supplied to the register 273. The write data RAM_WDATA[63:0] from the register 273 is supplied to the memory part 27-1, and the write data RAM_WDATA[127:64] from the register 273 is supplied to the memory part 27-2. The memory part 27-1 writes the write data RAM_WDATA[63:0] in response to the write enable signal XRAM_WE[7:0], and the memory part 27-2 writes the write data RAM_WDATA[127:64] in response to the write enable signal XRAM_WE[15:8].

In each of the embodiments described above, he memory sub system may be provided on a single semiconductor chip. In addition, the memory sub system and the main storage part may be provided on a single semiconductor chip. Furthermore, the processor part and the memory sub system may be provided on a single semiconductor chip. Moreover, all of the processor part, the memory sub system and the main storage part may be provided on a single semiconductor chip.

Of course, it is possible to appropriately combine the embodiments described above.

Figure 13:
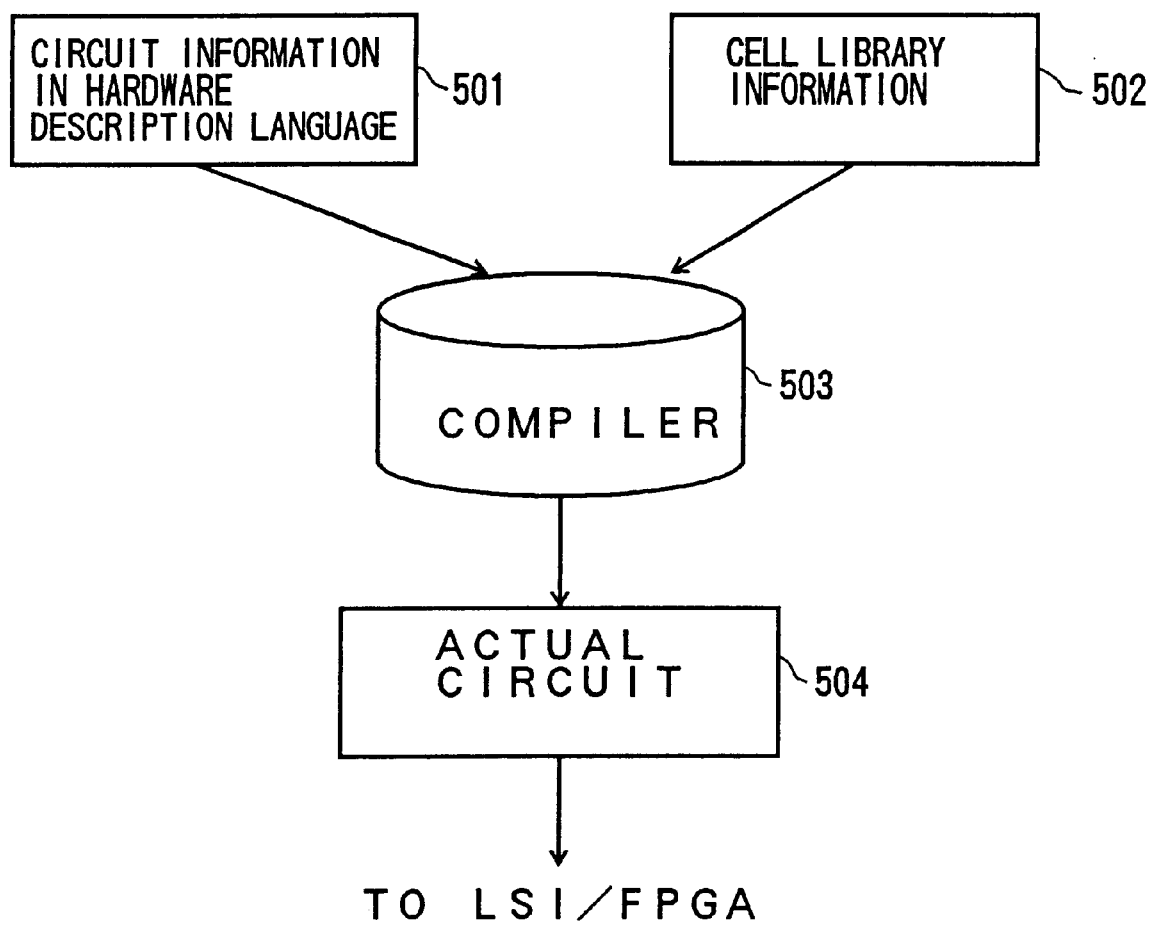
FIG. 13 is a diagram for explaining a process flow of a design process of an actual circuit.

Recently, there are proposals to design an actual circuit based on circuit information which is written in a hardware description language and cell library information. FIG. 13 is a diagram for explaining a process flow of such a design process of the actual circuit.

In FIG. 13, circuit information 501 is written in a hardware description language, and is made up of software virtual component information related to at least one of the processor part, the memory sub system and the main storage part of any one of the first through fifth embodiments of the information processing apparatus described above. Cell library information 502 is made up of cell information which depends on whether the actual circuit to be designed will be made in the form of a large scale integrated (LSI) circuit or a field programmable gate array (FPGA). A compiler 503 compiles the circuit information 501 and the cell library information 502, and outputs information related to an actual circuit 504. The LSI circuit or the FPGA is manufactured based on this information output from the compiler 503. Accordingly, even when the circuit information 501 of the actual circuit 504 differs depending on the manufacturer, it is possible to use the same process flow of the design process of the actual circuit 504 by simply modifying the cell library information 502 depending on the manufacturer.

Figure 14:
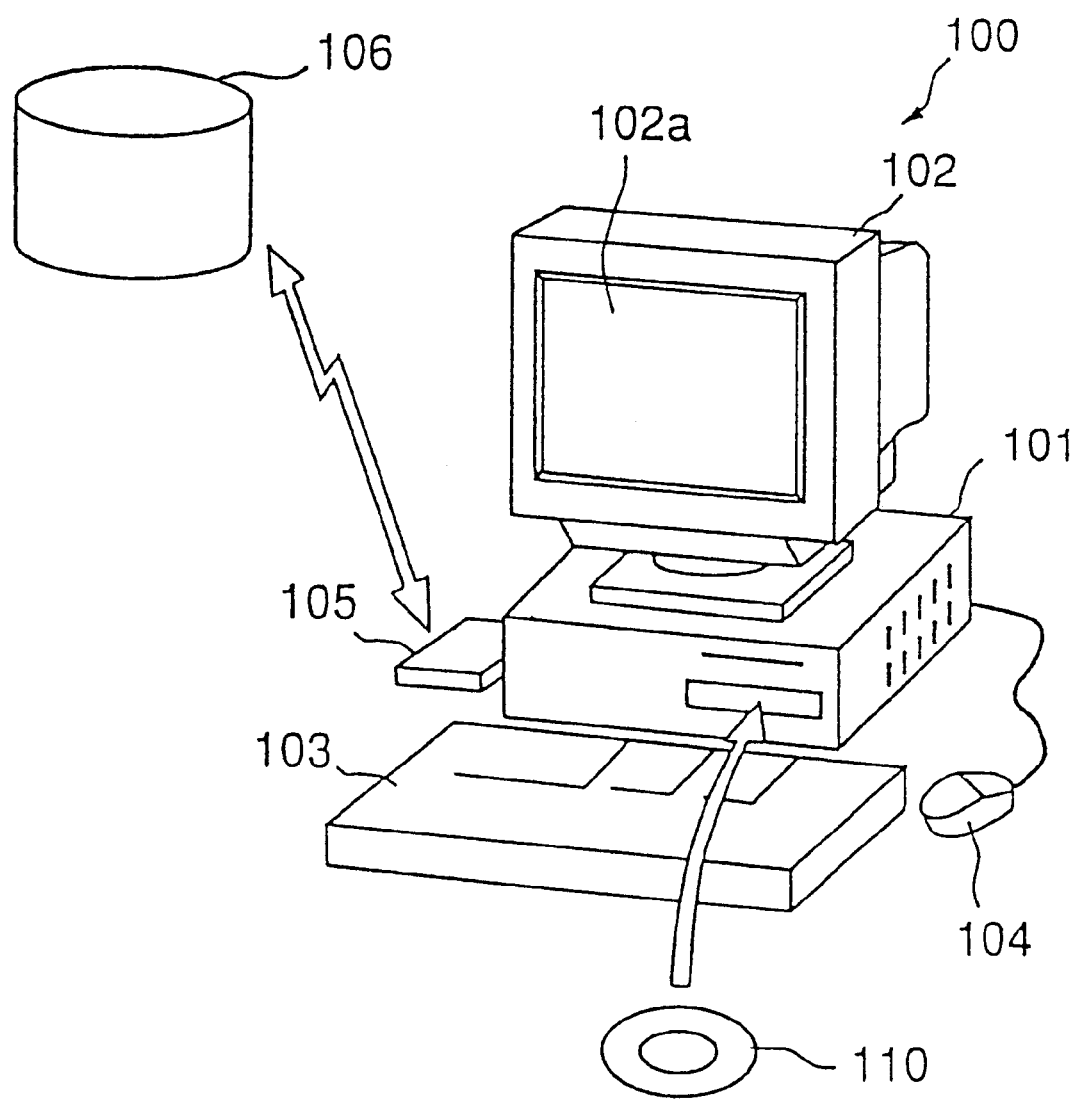
FIG. 14 is a perspective view showing a computer system which carries out the design process shown in FIG. 13.

FIG. 14 is a perspective view showing a computer system which carries out the design process shown in FIG. 13. In FIG. 14, a computer system 100 has a known construction including a main body part 101 which has a central processing unit (CPU), a disk drive and the like, a display 102 which displays an image on a display screen 102a based on an instruction from the main body part 101, a keyboard 103 which is used to input various information and instructions to the computer system 101, a mouse 104 which is used to specify an arbitrary position on the display screen 102a of the display 102, and a modem 105 which can make access to an external database. A program which is stored in a portable storage medium such as a disk 110 or is downloaded from an external database 106 by use of the modem 105 is input to and executed by the computer system 100.

A computer-readable storage medium according to the present invention may be a semiconductor memory device such as a RAM, ROM, PROM and EPROM, the disk 110 shown in FIG. 14, a card-shaped storage medium, and the like. In addition, the disk 110 may be a magnetic disk, an optical disk including a CD-ROM, a magneto-optical disk or the like.

The computer-readable storage medium stores at least the circuit information 501 which is written in a hardware description language. However, the computer-readable storage medium may additionally store a program for carrying out the design process shown in FIG. 13.

Next, a description will be given of the computer-readable storage medium according to the present invention. In this embodiment, the disk 110 shown in FIG. 14 forms the storage medium according to the present invention. This disk 110 is a computer-readable storage medium which stores circuit information written in a hardware description language, and includes a first data region which stores circuit information related to a judging means for decoding an address of an input request and outputting a judgement signal which indicates whether the input request is a cache control request or a DMA control request, and a second data region which stores circuit information related to a control means for carrying out a cache control when the judgement signal from the judging means indicates the cache control request and carrying out a DMA control when the judgement signal indicates the DMA control request.

Accordingly, based on the circuit information 501 read from the first and second data regions of the disk 110 and the cell library information 502 input from the keyboard 103, the disk 110, the database 106 or the like, the computer system 100 shown in FIG. 14 carries out the process of the compiler 503. Hence, the computer system 100 can design the actual circuit 504 by assembling the software virtual components as if actual circuit components were being assembled.

In each of the embodiments described above, the processor part which outputs the RISC type instruction and the DSP type instruction may be formed by a single microprocessor. Hence, in the following description, it is assumed for the sake of convenience that the processor part 1 is formed by a single microprocessor.

Figure 15:
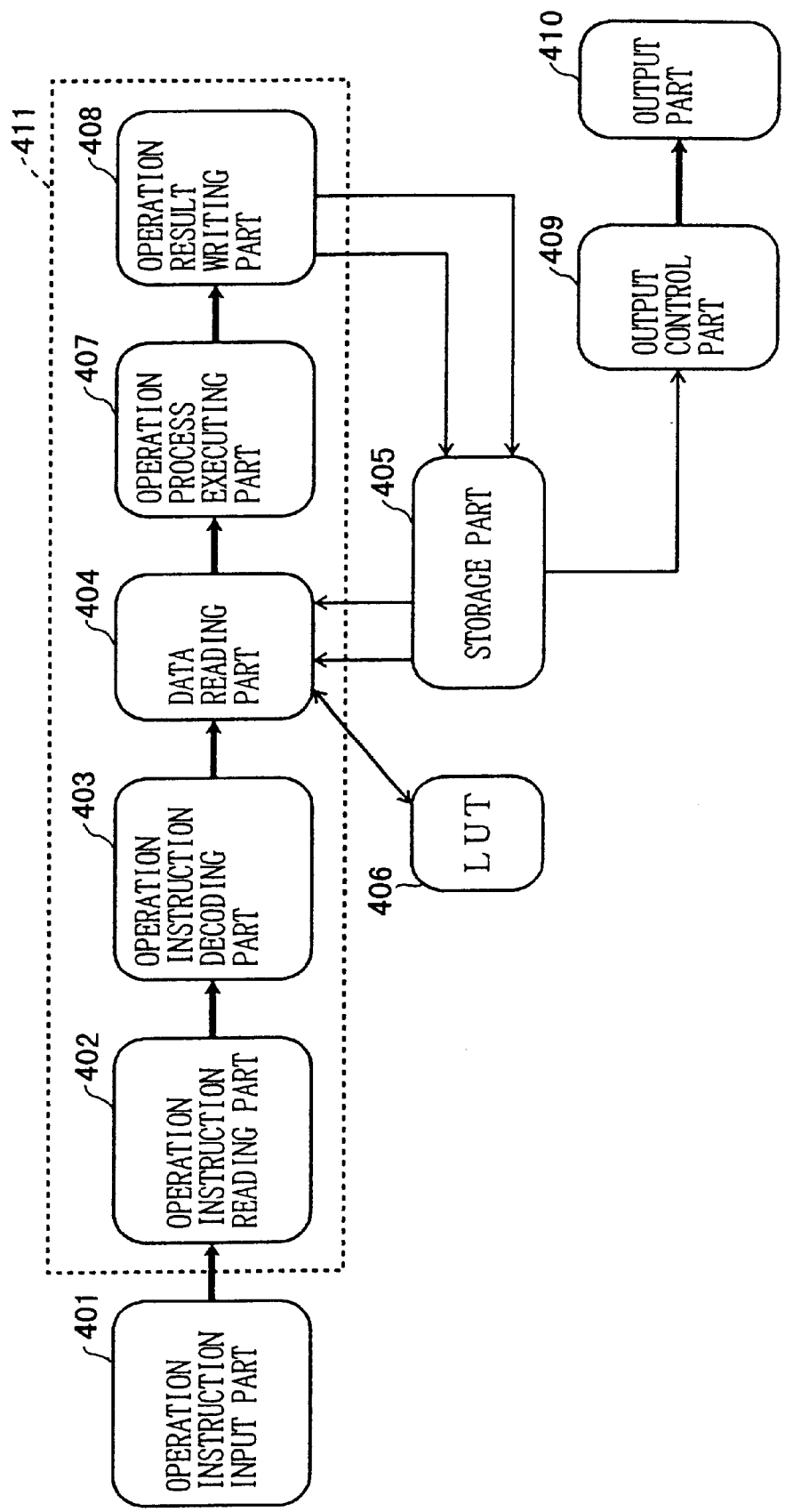
FIG. 15 is a diagram showing the construction of a processor part.

FIG. 15 is a diagram showing the construction of the processor part 1. In FIG. 15, because of the need to execute a large amount of operation processes at a high speed, this microprocessor part 1 includes a pipeline 411, an operation instruction input part 401, a storage part 405, a look up table (LUT) 406, an output control part 409, and an output part 410. The pipeline 411 includes an operation instruction reading part 402, an operation instruction decoding part 403, a data reading part 404, an operation process executing part 407, and an operation result writing part 408. The operation instruction input part 401 inputs a microcode with respect to the pipeline 411. The storage part 405 stores an operation result. The LUT 406 stores an operation process instruction code. The output control part 409 and the output part 410 are used to output an operation result and the like stored in the storage part 405. An operation process is efficiently executed by a pipeline process which executes the operation process in parallel. The LUT 406 is formed by a memory such as a RAM, and can be set arbitrarily by the user.

A description will be given of the functions of each of the parts forming the pipeline 411 of the microprocessor part 1 having the construction described above.

The operation instruction reading part 402 has a function of reading (fetching) a microcode which is made up of information which indicates transfer contents of input and output data necessary for an operation process, and address information (this address information will hereinafter be referred to as an operation ID) which indicates a process instruction or a storage location of a process instruction.

The operation instruction decoding part 403 has a function of decoding the microcode read by the operation instruction reading part 402.

The data reading part 404 has a function of reading from the storage part 405 the input data necessary for the operation process, based on the information which indicates the transfer contents of the input and output data of the microcode decoded in the operation instruction decoding part 403, and a function of reading the process instruction from the LUT 406 based on an address indicated by the operation ID, in a case where the microcode includes the operation ID.

The operation process executing part 407 includes a plurality of operation unit resources of addition, subtraction, multiplication, division, product-sum and the like, and has a function of executing a predetermined operation according to the process instruction and the input data read by the data reading part 404.

The operation result writing part 408 has a function of writing an operation result of the operation process executed by the operation process executing part 407 in the storage part 405, based on an address indicating the storage location of the output data obtained from the data reading part 404 via the operation process executing part 407.

The microprocessor part 1 having the construction and functions described above is capable of reading the process instruction based on the operation ID forming the microcode. For this reason, it is possible to cope with a complex and high-level operation process instruction code while realizing a short microcode.

Next, a description will be given of the microcode for executing the operation process in the microprocessor part 1 shown in FIG. 15, by referring to FIG. 16.

Figure 16:
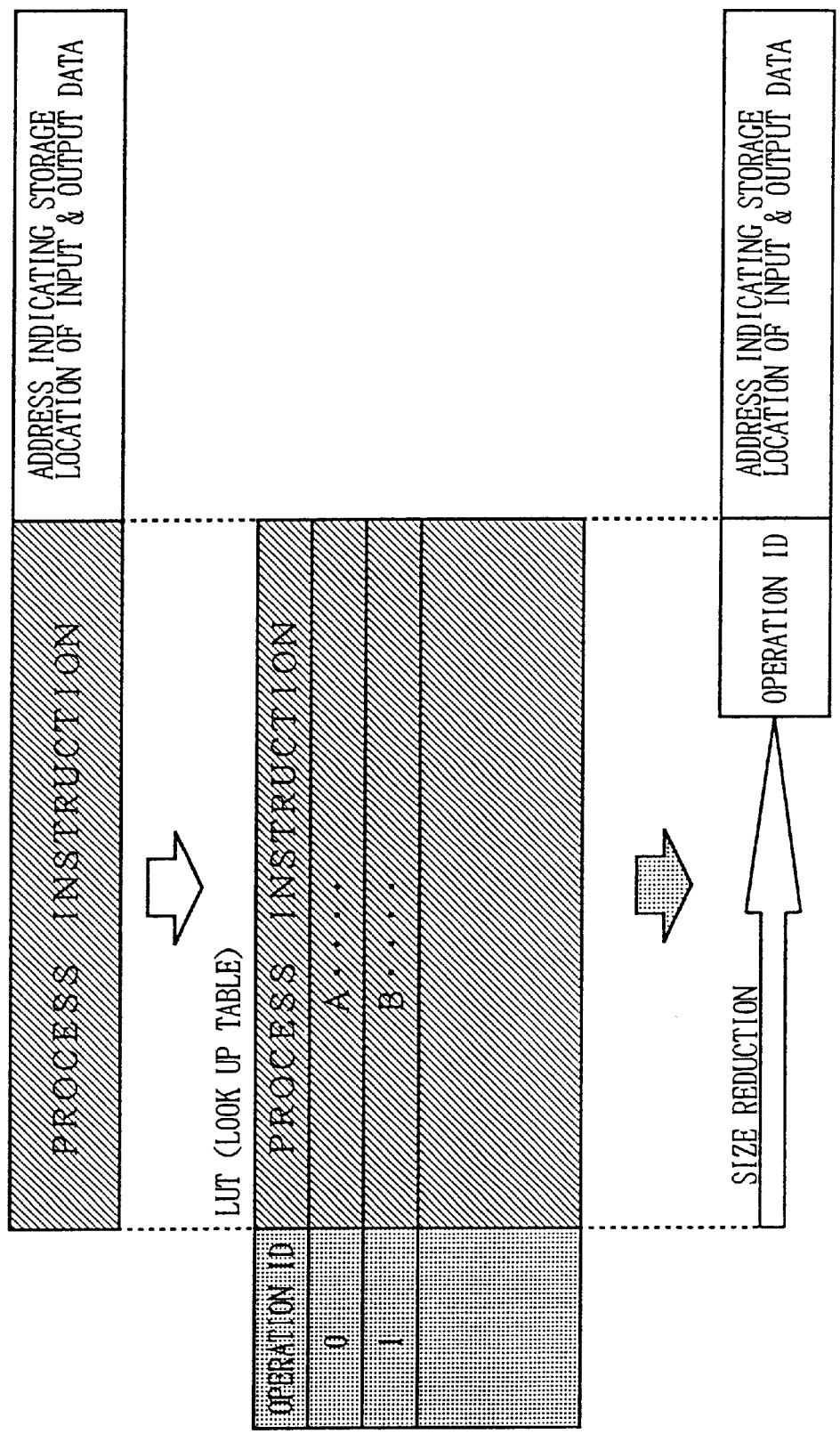
FIG. 16 is a diagram for explaining the construction of a microcode.

As shown in the upper part of FIG. 16, for example, the conventional microcode is made up of a process instruction (combined with a RISC type instruction) and input and output data. But as the microcode is extended due to the complexity and high level of the process instruction, operation process information may not be sufficiently allocated and implemented in the microcode.

Hence, the microcode for executing the operation process in the microprocessor part 1 is constructed to include the operation ID as shown in the lower part of FIG. 16, so that the microcode can be reduced even if the operation process is complex. As described above, the address information of the LUT 406 is indicated in the operation ID, and the complex and high-level process instruction is stored in the LUT 406.

Since the microcode is made up of the operation ID and the information which indicates the transfer contents of the input and output data, this microprocessor part 1 can use the LUT 406 and easily cope with a complex process instruction (an instruction subjected to an operation process by one pipeline) which is made up of a plurality of RISC type instructions (basic instructions which use only one operation unit resource). As a result, this microprocessor part 1 can easily cope with the complexity and high level of the operation process which will further increase in the future.

In addition, by reducing the microcode as shown in FIG. 16, it is possible to reduce an instruction cache which temporarily stores the instruction.

Moreover, in this microprocessor part 1, it is possible to directly implement the process instruction as in the conventional case, in place of the operation ID. For example, in a case where the process instruction is a single RISC type instruction, the RISC type instruction can be implemented as it is in place of the operation ID, because the microcode will not be extended thereby. In addition, depending on the size of the microcode, it is possible to directly implement two or more RISC type instructions. For this reason, this microprocessor part 1 can efficiently decode the operation process instruction without making access to the LUT 406.

Figure 17:
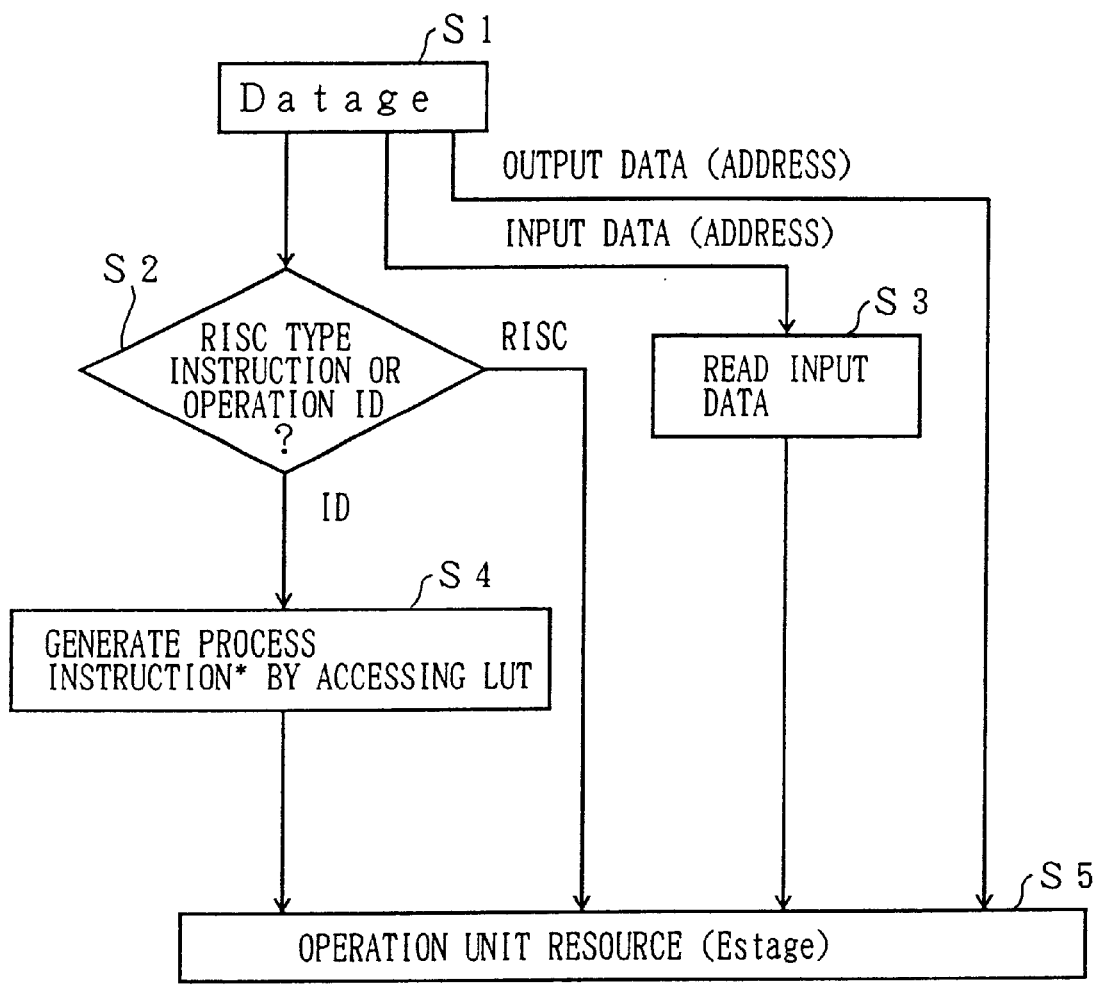
FIG. 17 is a flow chart for explaining an operation process execution method of the processor part.
Figure 18:
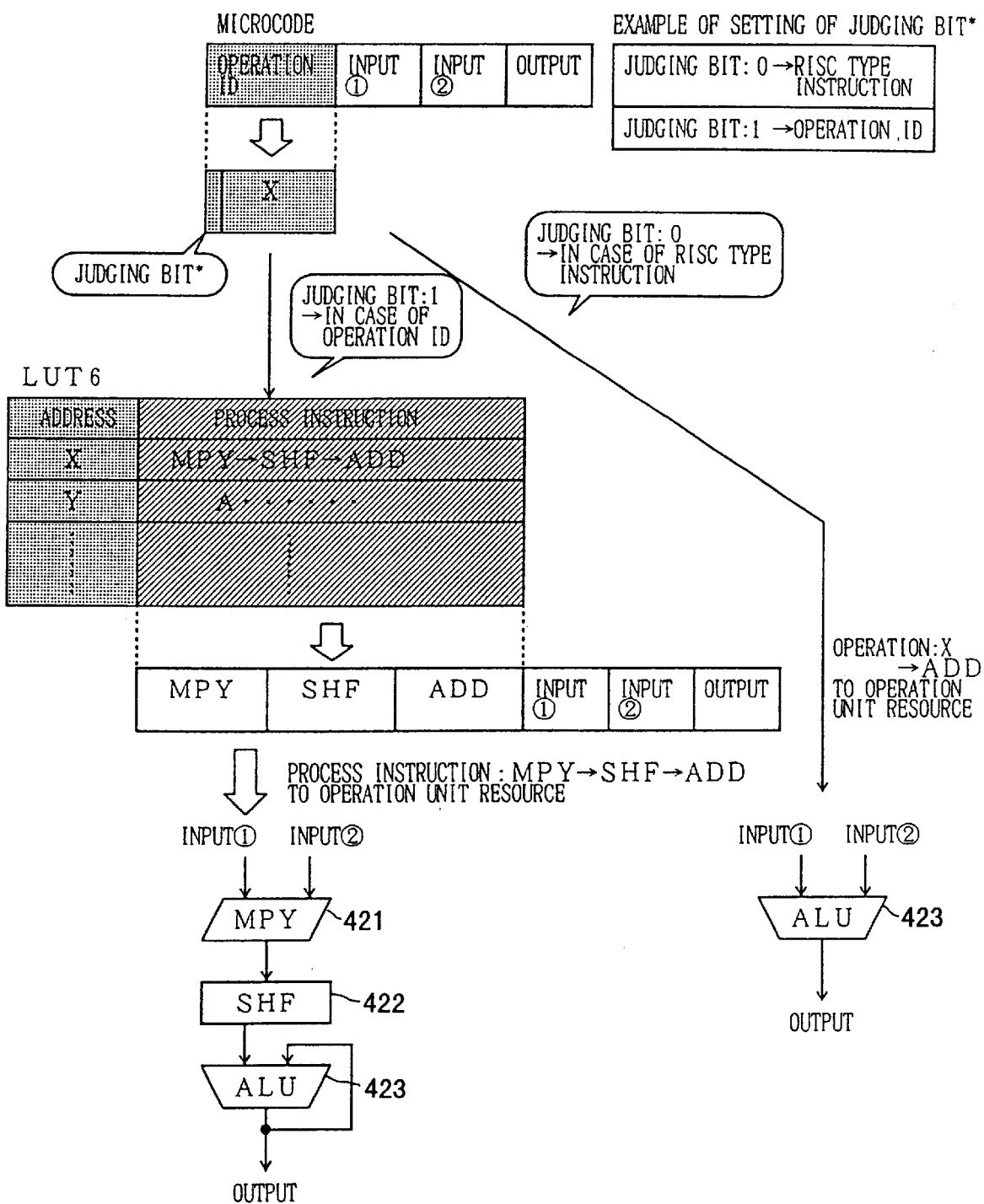
FIG. 18 is a diagram for explaining the operation process of the processor part.

FIGS. 17 and 18 respectively show an operation process execution method and a particular example of an operation process which is carried out in a case where the microcode shown in FIG. 16 is input to the microprocessor part shown in FIG. 15.

When the pipeline 411 of the microprocessor shown in FIG. 15 is input with a microcode including information which indicates the transfer contents of the input and output data formed by address information which indicates a storage location of the output data, an input data ①, an input data ②, and an operation ID shown in FIG. 18, for example, this microcode is read by the operation instruction reading part 402 and is decoded by the operation instruction decoding part 403, in a step S1.

If a judging bit of the operation ID is "0" as shown in FIG. 18 as a result of the decoding carried out in the operation instruction decoding part 403, a step S2 decides that the operation ID is a RISC type instruction. On the other hand, a step reads the input data ① and the input data ② from the storage part 405 by the data reading part 404, based on an address indicating the storage location of each of the input data ① and the input data ②. At the same time, the step S1 notifies the address which indicates the storage location of the output data to the operation process executing part 407.

In the operation process executing part 407, a step S5 carries out an adding operation by an ALU 423 (adder) which is an operation unit resource corresponding to the RISC type instruction, for example, and stores an operation result of this adding operation in the storage part 405 based on the address which indicates the storage location of the output data.

On the other hand, if the judging bit of the operation ID is "1" as shown in FIG. 18 as a result of the decoding carried out in the operation instruction decoding part 403, the step S2 decides that the operation ID is an address "X" (ID) of the LUT 406. Hence, a step S4 reads the process instruction by the data reading part 404 based on the address "X". Furthermore, the step S3 reads the input data ① and the input data ② from the storage part 405 by the data reading part 404, based on the address indicating the storage location of each of the input data ① and the input data ②. As a result, the process instruction, the input data ①, the input data ②, and the address indicating the storage location of the output data are notified to the operation process executing part 407. For example, the process instruction within the LUT 406 stores "MPY→SHF→ADD" at the address "X" as shown in FIG. 18.

In a step S5, the operation process executing part 407 carries out a product-sum by a multiplier (MPY) 21, a shifter (SHF) and the adder (ALU) 423 which are operation unit resources corresponding to the process instruction, for example, and stores the operation result in the storage part 405 based on the address which indicates the storage location of the output data.

This microprocessor part 1 can efficiently execute the operation process by arbitrarily changing the contents of the LUT 406 by the user.

In addition, since this microprocessor part 1 executes a plurality of RISC type instructions in one process instruction, it is possible to reduce the number of instructions which are executed as a whole.

Further, the present invention is not limited to these embodiments, but various variations and modifications may be made without departing from the scope of the present invention.

What is claimed is:

1. An information processing apparatus comprising:
   judging for decoding an address of an input request and outputting a judgement signal which indicates whether said input request is a cache control request or a DMA control request;
   control means for carrying out a cache control when the judgement signal from said judging means indicates the cache control request, and carrying out a DMA control when the judgement signal indicates the DMA control request; and
   a memory part including a first region which forms a cache memory part used for the cache control, and a second region which forms a data memory part used for the DMA control,
   said control means including means for variably setting a ratio X:Y of the first and second regions based on a parameter, where both X and Y are greater than zero.

2. The information processing apparatus as claimed in claim 1, wherein said memory part has a multi-port structure.

3. The information processing apparatus as claimed in claim 1, which further comprises:
   N memory parts forming the first region which forms said cache memory part used for the cache control, and the second region which forms the data memory part used for the DMA control, and
   each of said N memory parts having a data width L which is less than or equal to a maximum data width M of the input request, where L, N and M are integers satisfying $LN \geq 2M$.

4. The information processing apparatus as claimed in claim 3, wherein said memory parts have a multi-port structure.

5. The information processing apparatus as claimed in claim 1, wherein each part of the information processing apparatus is provided on a single chip.

6. The information processing apparatus as claimed in claim 1, which further comprises:
   a single processor part which outputs said input request.

7. The information processing apparatus as claimed in claim 6, wherein each part of the information processing apparatus is provided on a single chip.

8. The information processing apparatus as claimed in claim 1, which further comprises:

a main storage part coupled to said memory part which is used for the cache control and the DMA control.

9. The information processing apparatus as claimed in claim 8, which further comprises:

a single processor part which outputs said input request.

10. The information processing apparatus as claimed in claim 8, wherein each part of the information processing apparatus is provided on a single chip.

11. The information processing apparatus as claimed in claim 1, which further comprises;

a main storage part, said data memory part having two or more independently accessible ports, said judging means including a decoder part which decodes the address of said input request and outputs a signal indicating whether said input request is a first request to said cache memory part or a second request to said data memory part, said control means including a data selector part which selectively outputs data read from said cache memory part and said data memory part to a request source in response to the signal from said decoder part when said input request is a read request, a cache control part reading requested data from said cache memory part or said main storage part and outputting the requested data to said data selector part when the first request is a read request and writing data to said cache memory part or said main storage part when the first request is a write request in response to the signal from said decoder part, and a DMA control part controlling a data transfer between said main storage part and said data memory part by occupying one port of said data memory part when said input request is the second request, and said data memory part reading requested data from said data memory part or said main storage part using one port not occupied by said DMA control part and outputting the requested data to said data selector part when the second request is a read request and writing data to said data memory part or said main storage part when the second request is a write request in response to the signal from said decoder part.

12. The information processing apparatus as claimed in claim 11, which further comprises:

a single processor part which outputs said input request.

13. The information processing apparatus as claimed in claim 12, wherein each part of the information processing apparatus is provided on a single chip.

14. A computer-readable storage medium which stores circuit information in a hardware description language, comprising:

a first data region storing circuit information related to a judging means for decoding an address of an input request and outputting a judgement signal which indicates whether said input request is a cache control request or a DMA control request;

a second data region storing circuit information related to a control means for carrying out a cache control when the judgement signal from said judging means indicates the cache control request, and carrying out a DMA control when the judgement signal indicates the DMA control request; and a third memory region storing circuit information which is related to a memory part including a first region which forms a cache memory part used for the cache control, and a second region which forms a data memory part used for the DMA control, and storing a variable which is related to a ratio X:Y which sets a size of first and second regions based on a parameter, where both X and Y are greater than zero.

15. An information processing apparatus comprising:

a judging section decoding an address of an input request and outputting a judgement signal which indicates whether said input request is a cache control request or a DMA control request;

a control section carrying out a cache control when the judgement signal from said judging section indicates the cache control request, and carrying out a DMA control when the judgement signal indicates the DMA control request; and a memory part including a first region which forms a cache memory part used for the cache control, and a second region which forms a data memory part used for the DMA control, said control section variably setting a ratio X:Y of the first and second regions based on a parameter, where both X and Y are greater than zero.

16. The information processing apparatus as claimed in claim 15, wherein said memory part has a multi-port structure.

17. The new information processing apparatus as claimed in claim 15, which further comprises:

N memory parts forming the first region which forms said cache memory part used for the cache control, and the second region which forms the data memory part used for the DMA control, and each of said N memory parts having a data width L which is less than or equal to a maximum data width M of the input request, where L, N and M are integers satisfying $LN \geq 2M$.

18. The information processing apparatus as claimed in claim 15, wherein each part of the information processing apparatus is provided on a single chip.

19. The information processing apparatus as claimed in claim 15, which further comprises:

a single processor part which outputs said input request.

20. The information processing apparatus as claimed in claim 15, which further comprises:

a main storage part coupled to said memory part which is used for the cache control and the DMA control.

21. The information processing apparatus as claimed in claim 18, which further comprises:

a main storage part, said data memory part having two or more independently accessible ports, said judging section including a decoder part which decodes the address of said input request and outputs a signal indicating whether said input request is a first request to said cache memory part or a second request to said data memory part, said control section including a data selector part which selectively outputs data read from said cache memory part and said data memory part to a request source in response to the signal from said decoder part when said input request is a read request, a cache control part reading requested data from said cache memory part or said main storage part and outputting the requested data to said data selector part when the first request is a read request and writing data to said cache memory part or said main storage part when the first request is a write request in response to the signal from said decoder part, and a DMA control part controlling a data transfer between said main storage part and said data memory part by occupying one port of said data memory part when said input request is the second request, and said data memory part reading requested data from said data memory part or said main storage part using one port not occupied by said DMA control part and outputting the requested data to said data selector part when the second request is a read request and writing data to said data memory part or said main storage part when the second request is a write request in response to the signal from said decoder part.

\* \* \* \* \*

UNITED STATES PATENT AND TRADEMARK OFFICE
CERTIFICATE OF CORRECTION

PATENT NO.    : 6,378,050 B1                                                         Page 1 of 1
DATED         : April 23, 2002
INVENTOR(S)   : Toru Tsuruta et al.

It is certified that error appears in the above-identified patent and that said Letters Patent is hereby corrected as shown below:

<u>Title page, Item [54] and Column 1, lines 1-2,</u>
Change "AND STORAGE MEDIUM" to -- WHICH CARRIES OUT CACHE CONTROL, OR DMA CONTROL DEPENDING ON INPUT REQUEST, AND STORAGE MEDIUM STORING PROGRAM FOR DESIGNING THE INFORMATION PROCESSING APPARATUS --.

<u>Column 18,</u>
Line 25, after "judging" insert -- means --.

<u>Column 20,</u>
Line 48, change "18" to -- 15 --.

Signed and Sealed this

Second Day of July, 2002

*Attest:*

*Attesting Officer*

JAMES E. ROGAN
*Director of the United States Patent and Trademark Office*